(12) United States Patent
Shimoji et al.

(10) Patent No.: US 10,638,396 B2
(45) Date of Patent: Apr. 28, 2020

(54) INFORMATION PROCESSING DEVICE, INFORMATION PROCESSING METHOD, AND PROGRAM

(71) Applicant: Sony Corporation, Tokyo (JP)

(72) Inventors: Katsuya Shimoji, Tokyo (JP); Toshinori Kanemoto, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 16/391,722

(22) Filed: Apr. 23, 2019

(65) Prior Publication Data

US 2019/0253950 A1    Aug. 15, 2019

Related U.S. Application Data

(63) Continuation of application No. 14/395,305, filed as application No. PCT/JP2013/058682 on Mar. 26, 2013, now Pat. No. 10,375,615.

(30) Foreign Application Priority Data

Apr. 27, 2012  (JP) .................................. 2012-103448

(51) Int. Cl.
*H04W 76/00*    (2018.01)
*H04B 5/00*     (2006.01)
(Continued)

(52) U.S. Cl.
CPC .......... *H04W 36/34* (2013.01); *H04B 5/0031* (2013.01); *H04L 67/2819* (2013.01);
(Continued)

(58) Field of Classification Search
CPC .... H04B 7/14; H04B 7/18578; H04B 5/0031; H04W 88/04; H04W 36/34; H04W 40/04; H04W 76/02
See application file for complete search history.

(56) References Cited

U.S. PATENT DOCUMENTS 7,948,925 B2  5/2011 Miyabayashi et al.
8,565,131 B2  10/2013 Miyabayashi et al.
(Continued)

FOREIGN PATENT DOCUMENTS

JP  2004200887 A  7/2004
JP  2007129320 A  5/2007
(Continued)

OTHER PUBLICATIONS

Extended European Search Report including Written Opinion for Application No. EP 19152185.5, dated May 29, 2019, pp. 1-6.
(Continued)

*Primary Examiner* — Andrew Wendell
(74) *Attorney, Agent, or Firm* — Lerner, David, Littenberg, Krumholz & Mentlik, LLP

(57) ABSTRACT

Provided is an information processing device including a decision unit to decide, based on process capability information acquired through a first communication path from at least one of a first and second control target device which are target devices to be caused to perform wireless communication through a second communication path that is different from the first communication path, the process capability information, a transmission target control target device between the first and second control target device to which connection information of the other control target device is to be transmitted out of connection information acquired from each of the first and second control target device through the first communication path, and a transmission control unit to cause the connection information of the other control target device to be transmitted to the transmission target control target device.

15 Claims, 13 Drawing Sheets

(51) Int. Cl.
  *H04W 36/34* (2009.01)
  *H04W 76/14* (2018.01)
  *H04L 29/08* (2006.01)
  *H04L 29/06* (2006.01)
  *H04W 84/12* (2009.01)

(52) U.S. Cl.
  CPC .......... *H04L 67/303* (2013.01); *H04L 67/34* (2013.01); *H04L 69/14* (2013.01); *H04L 69/24* (2013.01); *H04W 76/14* (2018.02); *H04L 69/18* (2013.01); *H04W 84/12* (2013.01)

(56) References Cited

U.S. PATENT DOCUMENTS

| | | | |
|---|---|---|---|
| 10,375,615 B2 * | 8/2019 | Shimoji | |
| 2007/0201410 A1 | 8/2007 | Ginzburg | |
| 2007/0208810 A1 * | 9/2007 | Mostafa | H04L 51/063 709/206 |
| 2007/0232357 A1 * | 10/2007 | Takasu | H04W 76/10 455/558 |
| 2008/0102798 A1 | 5/2008 | Fujimoto et al. | |
| 2008/0247545 A1 * | 10/2008 | Teruyama | H04L 9/0841 380/255 |
| 2008/0270619 A1 | 10/2008 | Davies et al. | |
| 2009/0154344 A1 | 6/2009 | Nishida | |
| 2010/0165882 A1 | 7/2010 | Palanki et al. | |
| 2011/0217960 A1 * | 9/2011 | Tanaka | H04B 1/692 455/414.1 |
| 2011/0258313 A1 | 10/2011 | Mallik et al. | |
| 2012/0069772 A1 | 3/2012 | Byrne et al. | |
| 2012/0077433 A1 | 3/2012 | Walker et al. | |
| 2012/0134349 A1 | 5/2012 | Jung et al. | |
| 2012/0166671 A1 | 6/2012 | Qi et al. | |
| 2013/0005246 A1 | 1/2013 | Waters et al. | |
| 2013/0185447 A1 | 7/2013 | Nagawade et al. | |
| 2014/0057670 A1 | 2/2014 | Lim et al. | |
| 2014/0091987 A1 | 4/2014 | Lee et al. | |
| 2015/0172965 A1 * | 6/2015 | Jeong | H04W 36/14 370/331 |
| 2016/0029275 A1 * | 1/2016 | Guo | H04W 8/22 455/436 |
| 2019/0273543 A1 * | 9/2019 | Yang | H04B 7/0452 |
| 2019/0289539 A1 * | 9/2019 | Lee | H04W 40/246 |

FOREIGN PATENT DOCUMENTS

| | | |
|---|---|---|
| JP | 2008060977 A | 3/2008 |
| JP | 2008283590 A | 11/2008 |
| JP | 2008306603 A | 12/2008 |
| JP | 2009207069 A | 9/2009 |
| JP | 2009218845 A | 9/2009 |
| JP | 2012514435 A | 6/2012 |
| JP | 2013507029 A | 2/2013 |
| JP | 2013516912 A | 5/2013 |
| JP | 2013520907 A | 6/2013 |
| WO | 2011039719 A1 | 4/2011 |
| WO | 2011085073 A1 | 7/2011 |
| WO | 2011105695 A2 | 9/2011 |

OTHER PUBLICATIONS

International Search Report from International Publication PCT/JP2013/058682 dated May 7, 2013.
Extended European Search Report for EP Application No. 13780612.1, dated Dec. 2, 2015.
Japanese Office Action for Application No. 2016-028547 dated Jan. 10, 2017.
Chinese Office Action for Application No. CN201380020837.6 dated Jul. 17, 2017.
Japanese Office Action for JP Application No. 2017187339, dated Dec. 25, 2018.

* cited by examiner

FIG. 1

| | | | |
|---|---|---|---|
| A | DEVICE NAME (NICKNAME) | | My Phone |
| | POSSIBILITY OF PROCESSING DATA RECEIVED IN NFC | | POSSIBLE/NOT POSSIBLE |
| | NFC PROFILE INFORMATION | | VERSION OF APPLIED STANDARD SPECIFICATION<br>CORRESPONDING ROLE<br>CORRESPONDING SCHEME |
| B1 | WIRELESS COMMUNICATION INTERFACE INFORMATION 1 | WIRELESS COMMUNICATION INTERFACE NAME | Bluetooth, Wi-Fi, ZigBee, etc. |
| | | ADDRESS INFORMATION | XX:XX:XX:XX:XX:XX |
| | | PROFILE INFORMATION | VERSION OF APPLIED STANDARD SPECIFICATION<br>CORRESPONDING ROLE<br>CORRESPONDING SCHEME<br>Class of Device |
| | | AUTHENTICATION SCHEME | Open, WEP, WPA, etc. |
| | | AUTHENTICATION INFORMATION | CERTIFICATE, PIN, AUTHENTICATION KEY, etc. |
| | | STATUS INFORMATION | Idle, Active, Inactive, etc. |
| | | TERM OF VALIDITY INFORMATION | NUMBER OF VALID TOUCHES, VALID TIME, etc. |
| | | VALID FLAG | Enabled/Disabled |
| | | POSSIBILITY OF PROCESSING DATA RECEIVED WITH INTERFACE | POSSIBLE/NOT POSSIBLE |
| B2 | WIRELESS COMMUNICATION INTERFACE INFORMATION 2 | ... | |
| | APPLICATION INFORMATION | ... | MP3, AAC, etc. |

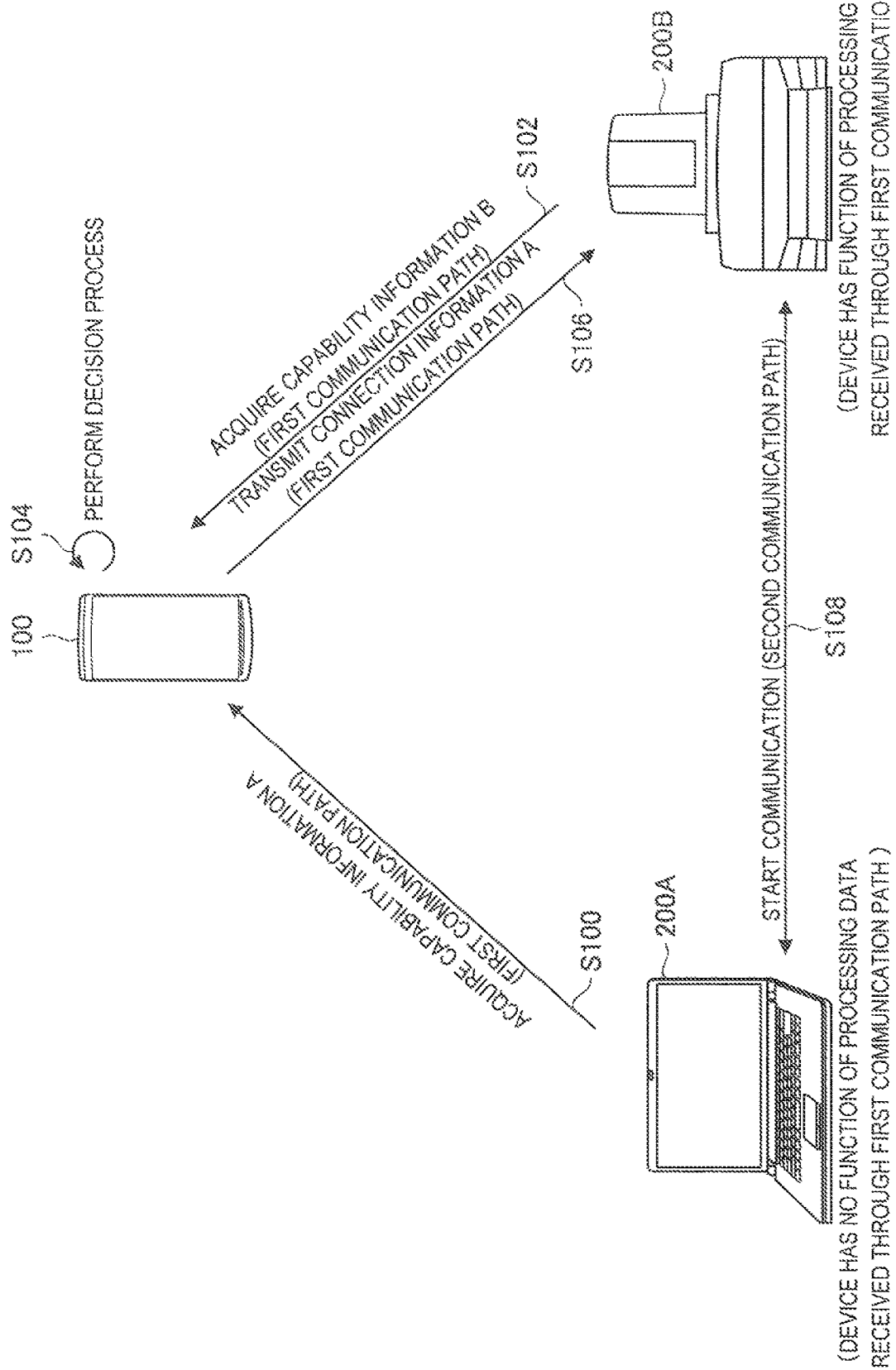

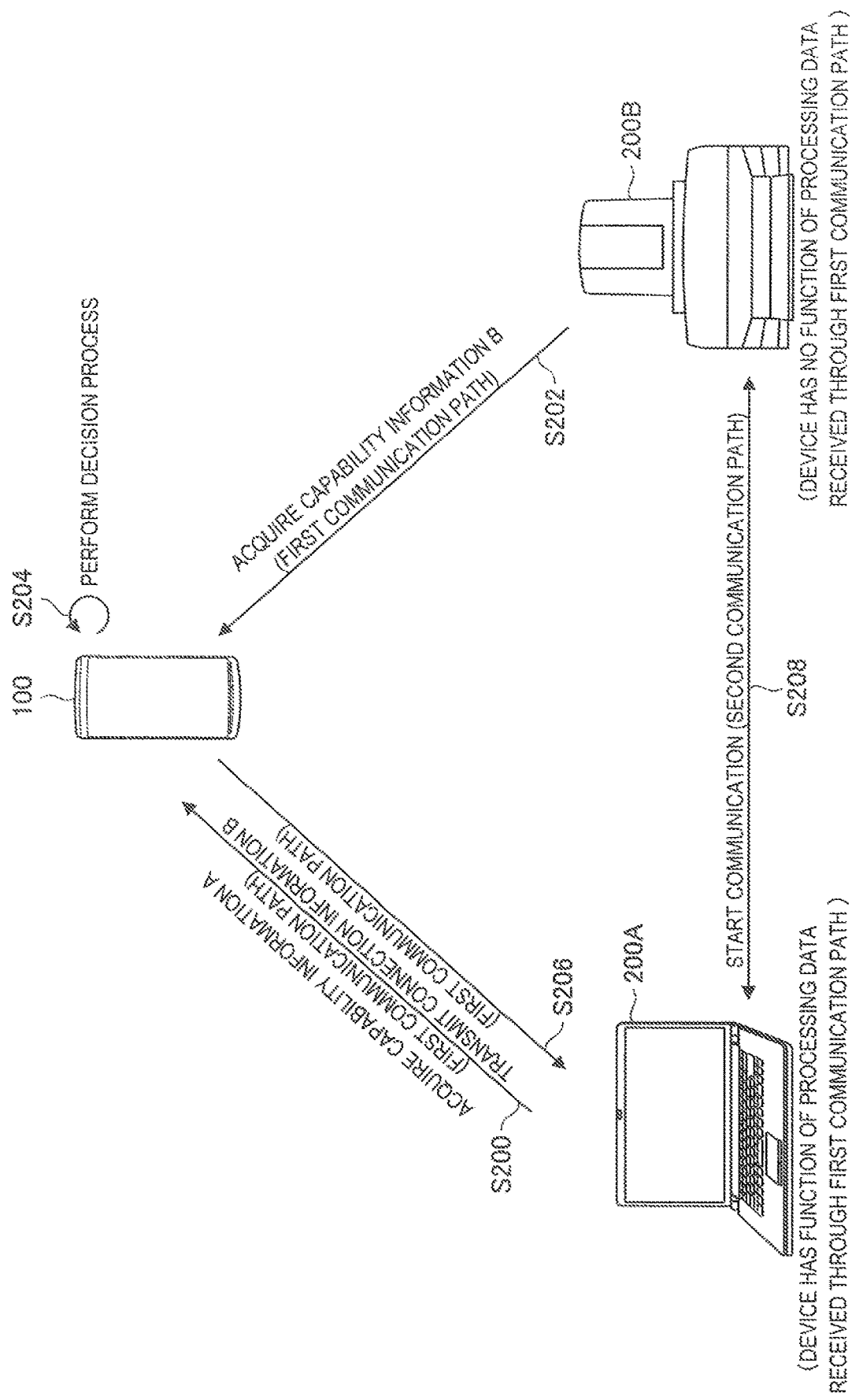

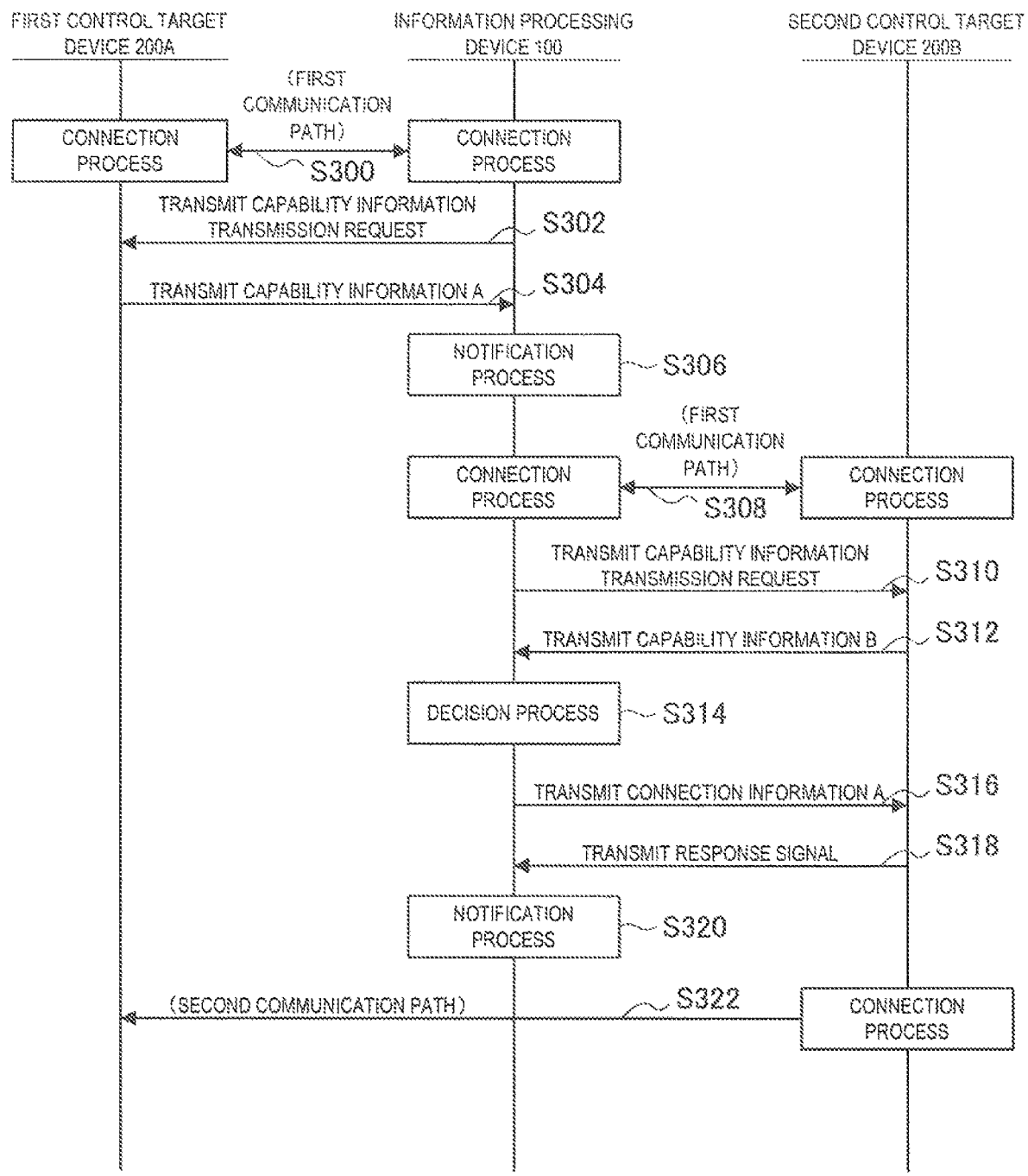

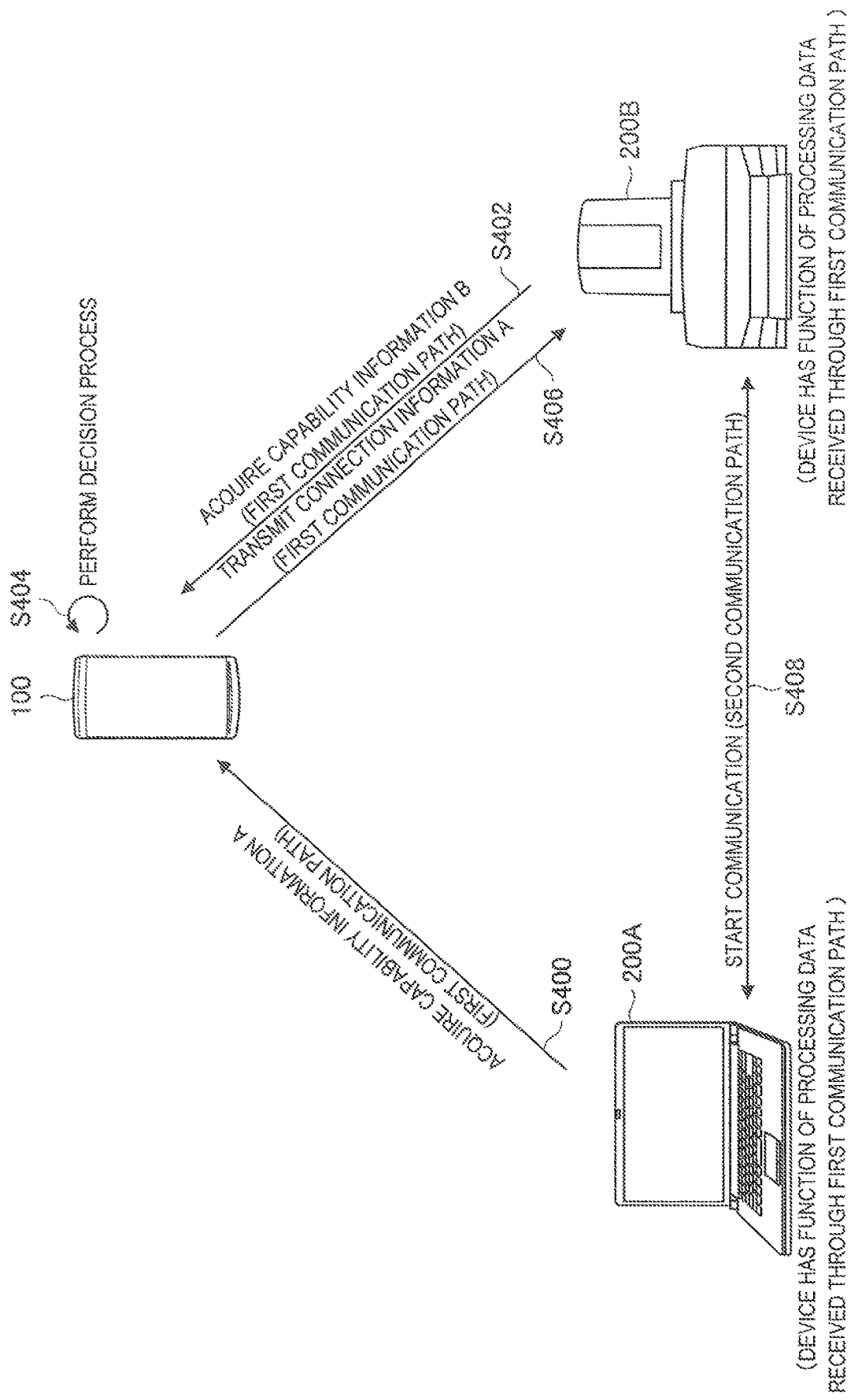

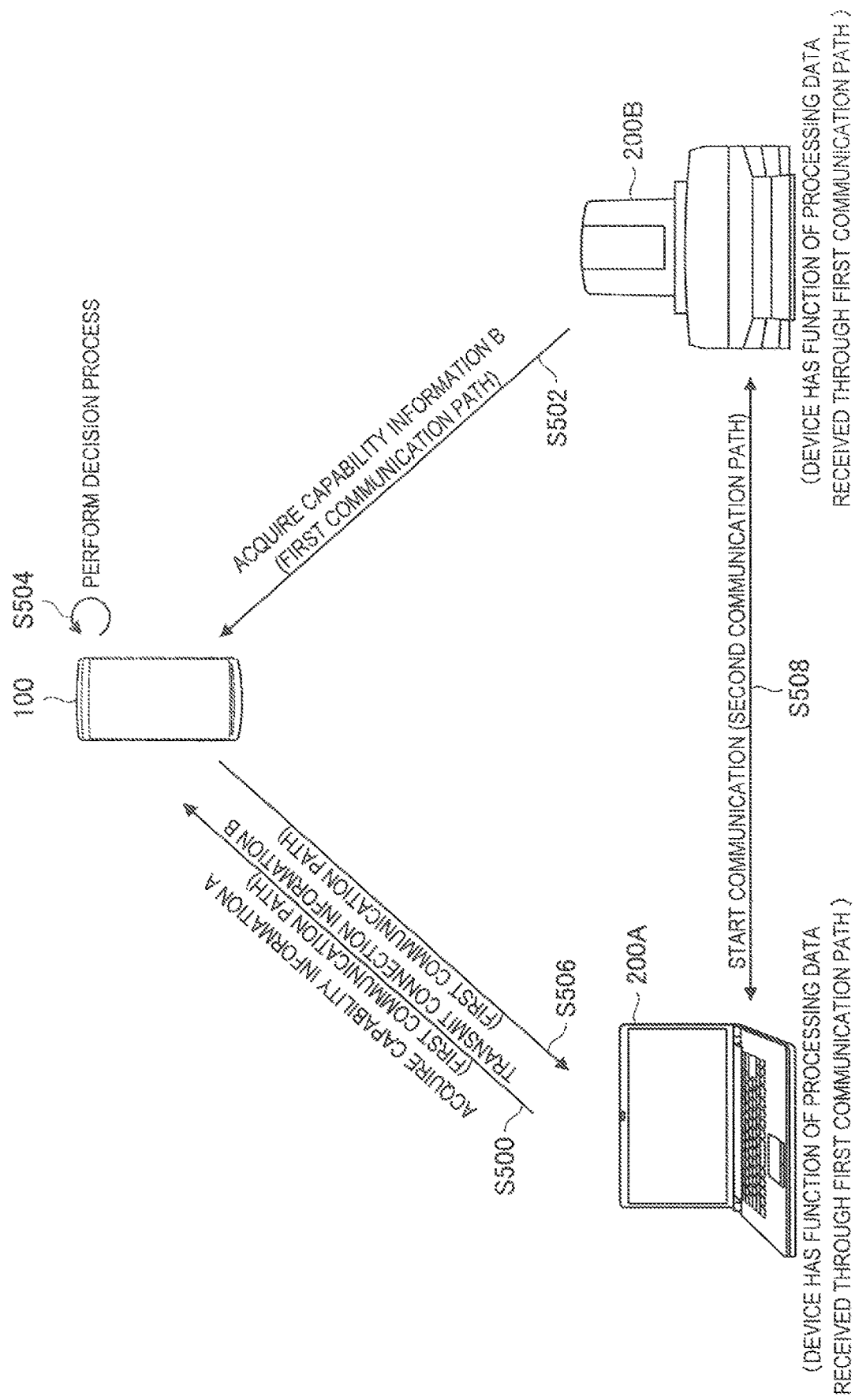

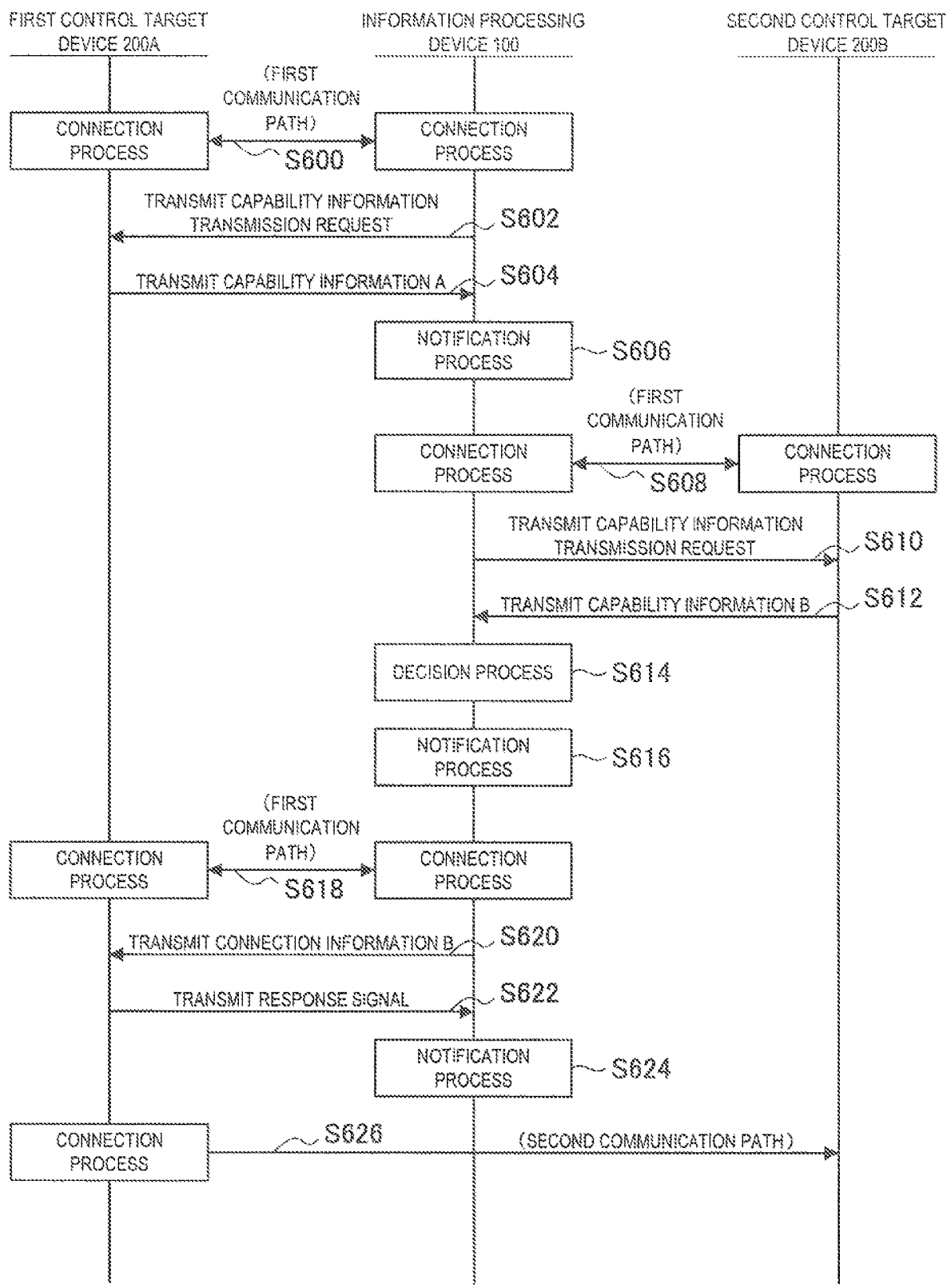

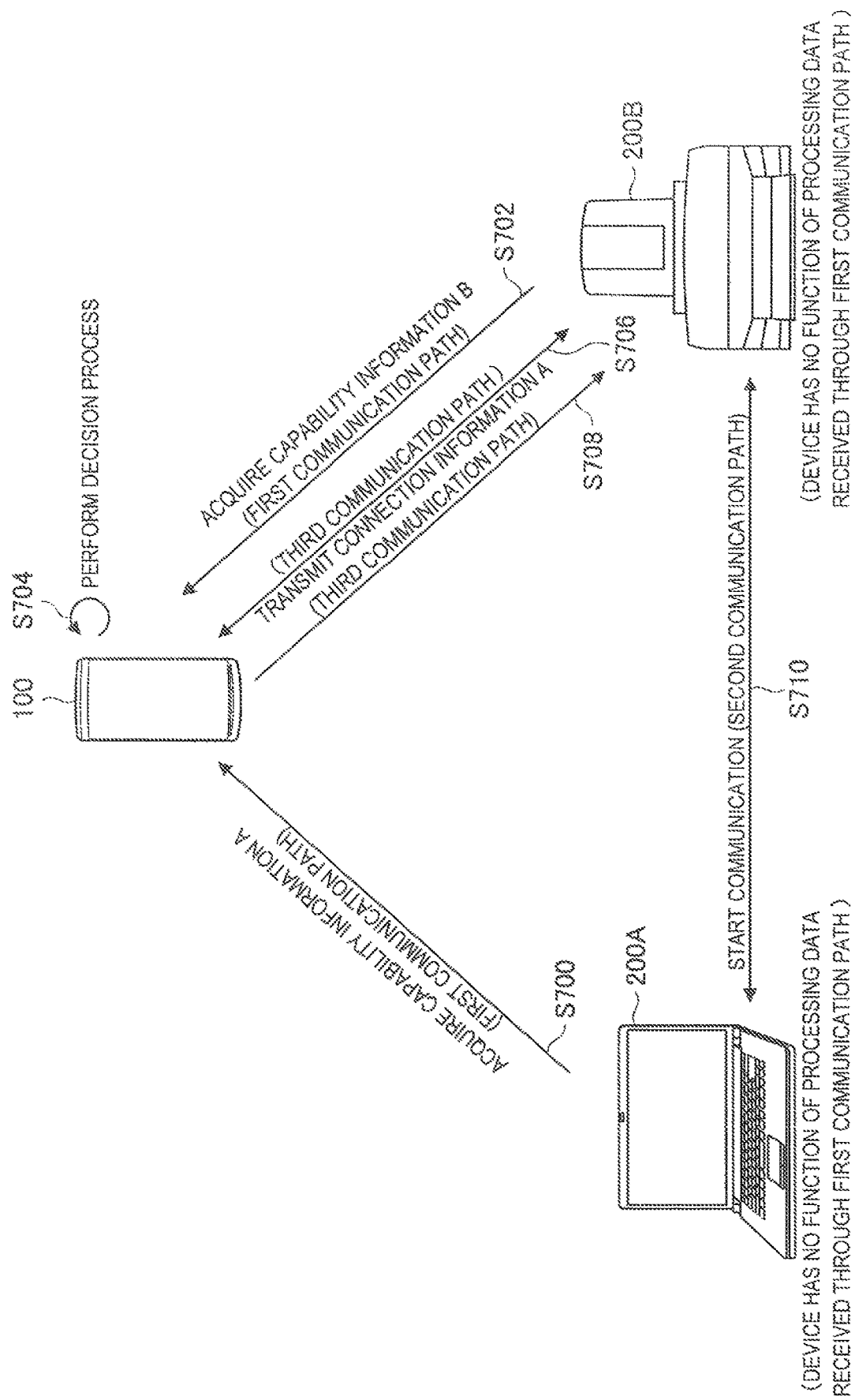

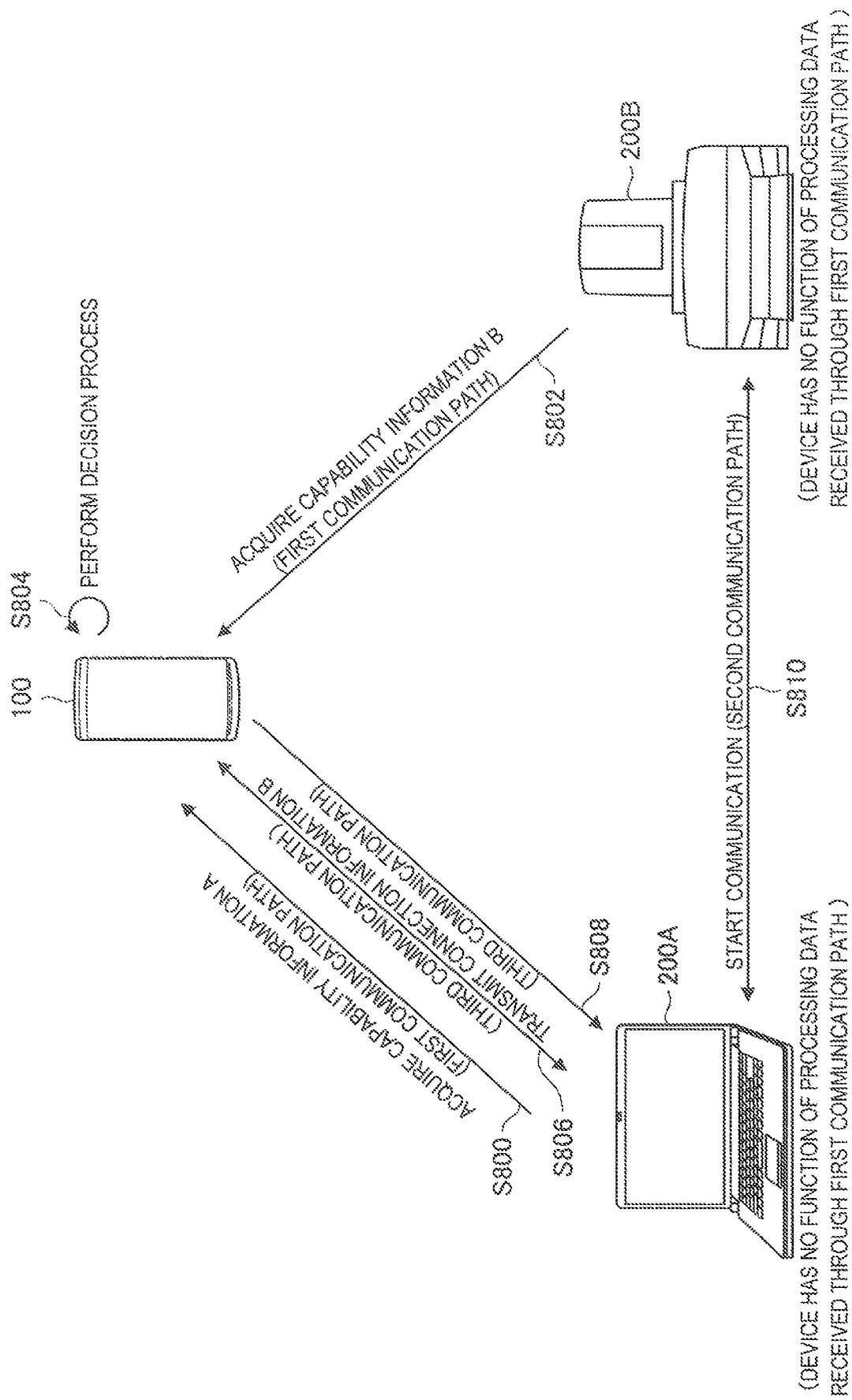

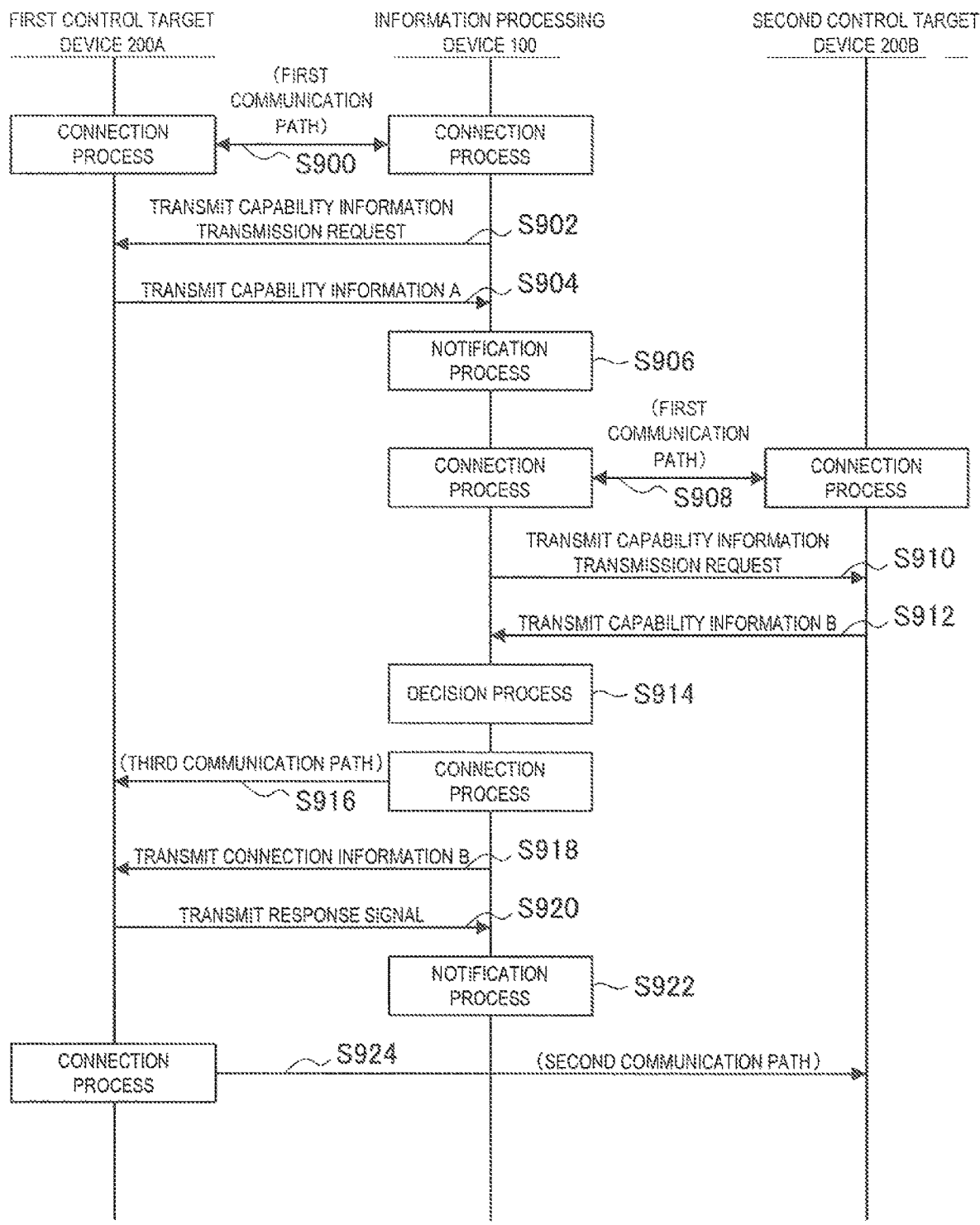

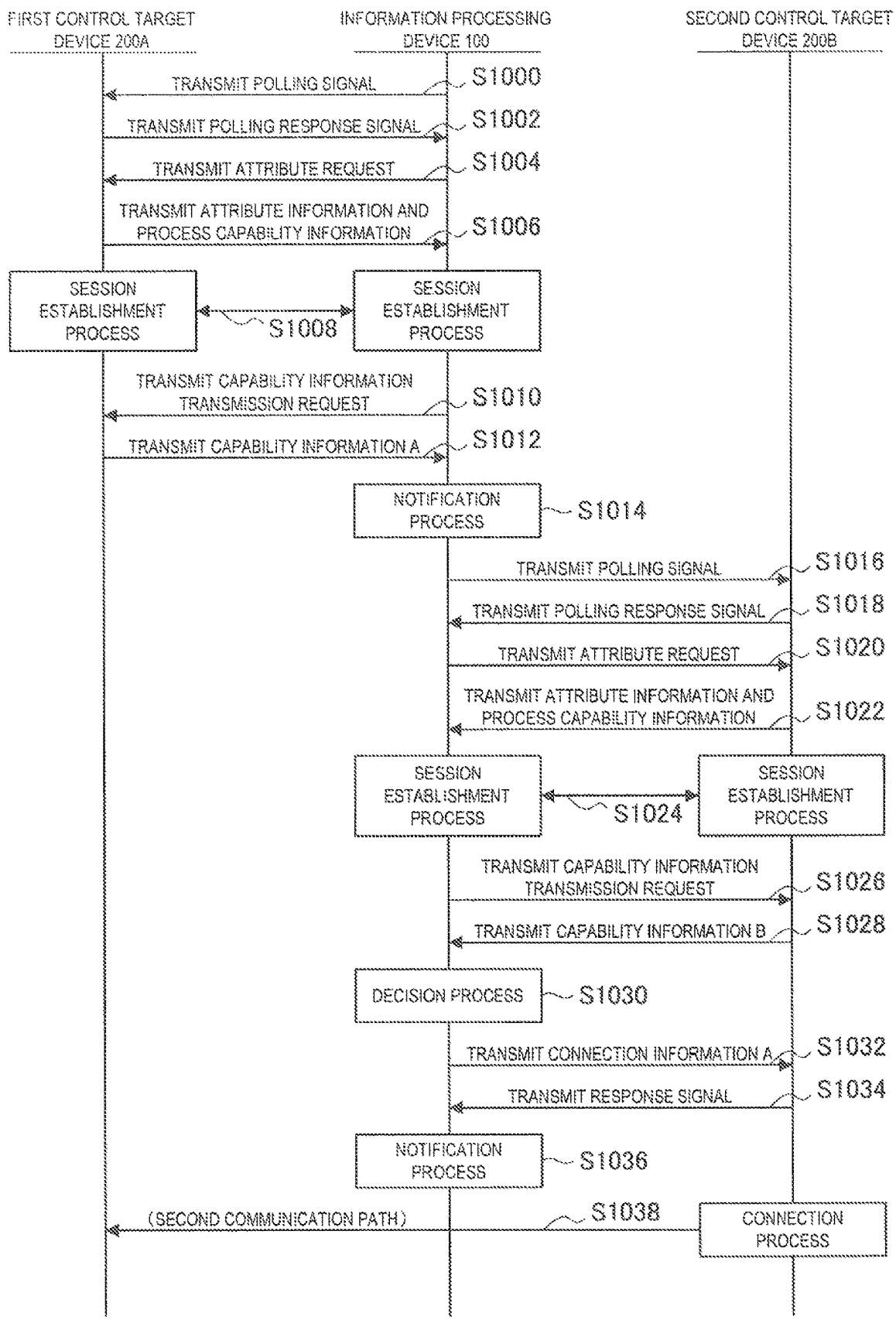

INFORMATION PROCESSING DEVICE, INFORMATION PROCESSING METHOD, AND PROGRAM

CROSS-REFERENCE TO RELATED APPLICATIONS

The present application is a continuation of U.S. patent application Ser. No. 14/395,305, filed on Oct. 17, 2014, which is a national phase entry under 35 U.S.C. § 371 of International Application No. PCT/JP2013/058682, filed on Mar. 26, 2013, published as WO 2013/161484 A1 on Oct. 31, 2013, which claims priority from Japanese Patent Application No. JP 2012-103448, filed in the Japanese Patent Office on Apr. 27, 2012, the disclosures of which are hereby incorporated herein by reference.

TECHNICAL FIELD

The present disclosure relates to an information processing device, an information processing method, and a program.

BACKGROUND ART

In recent years, high functionality of devices such as mobile telephones and smartphones has progressed, and among such devices, those that can perform communication using a plurality of communication means such as communication based on NFC (Near Field Communication), IEEE 802.15.1 (which is sometimes called "Bluetooth" (registered trademark)), and the like have also emerged. In addition, the technology which is called handover has been gradually used recently. The handover technology mentioned herein is a technology for performing communication by automatically switching a plurality of communication means that respond to different communication schemes. Between devices that use the handover technology, for example, authentication information of a second communication scheme is transferred using a communication path based on a first communication scheme, and then, using the authentication information, authentication based the second communication scheme is automatically set. Thus, the devices that use the handover technology can automatically perform communication using a communication path based on the second communication scheme, for example, without causing a user to be aware of an authentication process or a setting process.

In addition, technologies relating to the handover have also been developed. As a technology for causing devices to share data necessary for secure data communication by the medium of a security device, for example, the technology disclosed in Patent Literature 1 described below is exemplified.

CITATION LIST

Patent Literature

Patent Literature 1: JP 2007-129320A

SUMMARY OF INVENTION

Technical Problem

For example, the technology described in Patent Literature 1 is based on the premise that each of devices that perform data communication is configured such that a communication interface for performing data communication between the devices and a communication interface for performing communication with a security device that relates to sharing of data necessary for secure data communication are controlled by one controller. Thus, when the technology described in Patent Literature 1 is used, for example, if a controller included in a device such as a device to which an NFC tag, a non-contact IC (Integrated Circuit) card, or the like is affixed is not connected to the NFC tag (if the controller is not able to process data of the NFC tag), it is not possible to share data between the devices.

In addition, the connection handover specification that is a technical specification of NFC Forum is based on the premise that both devices that perform communication should respond to P2P (Peer to Peer) protocol that includes a connection interface with a controller, or at least one of the devices that perform communication should be a device that includes a connection interface with a controller (which is a case in which, for example, one has the function of a reader-writer and the other has only a tag). Thus, a user who uses a device that complies with the connection handover specification should be aware of, for example, what function of NFC each device supports (for example, whether a device responds to P2P, has only the tag function, or has only the function of a reader-writer). In addition, in the connection handover specification, there can be cases in which it is difficult to realize handover (performing communication by automatically switching a plurality of communication means that respond to different communication schemes) depending on a combination of devices that perform communication.

Thus, even if, for example, the technology described in Patent Literature 1 or the technology that relates to the connection handover specification that is the technical specification of NFC forum is used, devices which are targets to be caused to perform communication (which may be hereinafter referred to as "control target devices") are not caused to perform communication at all times.

The present disclosure proposes a novel and improved information processing device, information processing method, and program that can control communication performed between control target devices.

Solution to Problem

According to the present disclosure, there is provided an information processing device including a decision unit configured to decide, based on process capability information acquired through a first communication path from at least one of a first control target device and a second control target device which are target devices to be caused to perform wireless communication through a second communication path that is different from the first communication path, the process capability information indicating whether or not it is possible to process data received through the first communication path, a transmission target control target device between the first control target device and the second control target device, which is a control target device to which connection information of the other control target device is to be transmitted out of connection information acquired from each of the first control target device and the second control target device through the first communication path for starting communication through the second communication path, and a transmission control unit configured to cause the connection information of the other control target device to be transmitted to the transmission target control target device.

According to the present disclosure, there is provided an information processing method including a step of deciding, based on process capability information acquired through a first communication path from at least one of a first control target device and a second control target device which are target devices to be caused to perform wireless communication through a second communication path that is different from the first communication path, the process capability information indicating whether or not it is possible to process data received through the first communication path, a transmission target control target device between the first control target device and the second control target device, which is a control target device to which connection information of the other control target device is to be transmitted out of connection information acquired from each of the first control target device and the second control target device through the first communication path for starting communication through the second communication path, and a step of causing the connection information of the other control target device to be transmitted to the transmission target control target device.

According to the present disclosure, there is provided a program causing a computer to execute a step of deciding, based on process capability information acquired through a first communication path from at least one of a first control target device and a second control target device which are target devices to be caused to perform wireless communication through a second communication path that is different from the first communication path, the process capability information indicating whether or not it is possible to process data received through the first communication path, a transmission target control target device between the first control target device and the second control target device, which is a control target device to which connection information of the other control target device is to be transmitted out of connection information acquired from each of the first control target device and the second control target device through the first communication path for starting communication through the second communication path, and a step of causing the connection information of the other control target device to be transmitted to the transmission target control target device.

Advantageous Effects of Invention

According to the present disclosure, communication performed between control target devices can be controlled.

BRIEF DESCRIPTION OF DRAWINGS

FIG. 1 is a descriptive diagram showing an example of content represented by capability information according to an embodiment.

FIG. 2 is an illustrative diagram for describing a first example of a process relating to an information processing method according to the embodiment.

FIG. 3 is an illustrative diagram for describing a second example of a process relating to an information processing method according to the embodiment.

FIG. 4 is a sequence diagram showing an example of a process performed in an information processing system according to the embodiment.

FIG. 5 is an illustrative diagram for describing a third example of a process relating to an information processing method according to the embodiment.

FIG. 6 is an illustrative diagram for describing a fourth example of a process relating to an information processing method according to the embodiment.

FIG. 7 is a sequence diagram showing an example of a process performed in an information processing system according to the embodiment.

FIG. 8 is an illustrative diagram for describing a fifth example of a process relating to an information processing method according to the embodiment.

FIG. 9 is an illustrative diagram for describing a sixth example of a process relating to an information processing method according to the embodiment.

FIG. 10 is a sequence diagram showing an example of a process performed in an information processing system according to the embodiment.

FIG. 11 is a sequence diagram showing an example of a process performed in an information processing system according to the embodiment.

DESCRIPTION OF EMBODIMENTS

Figure 12:
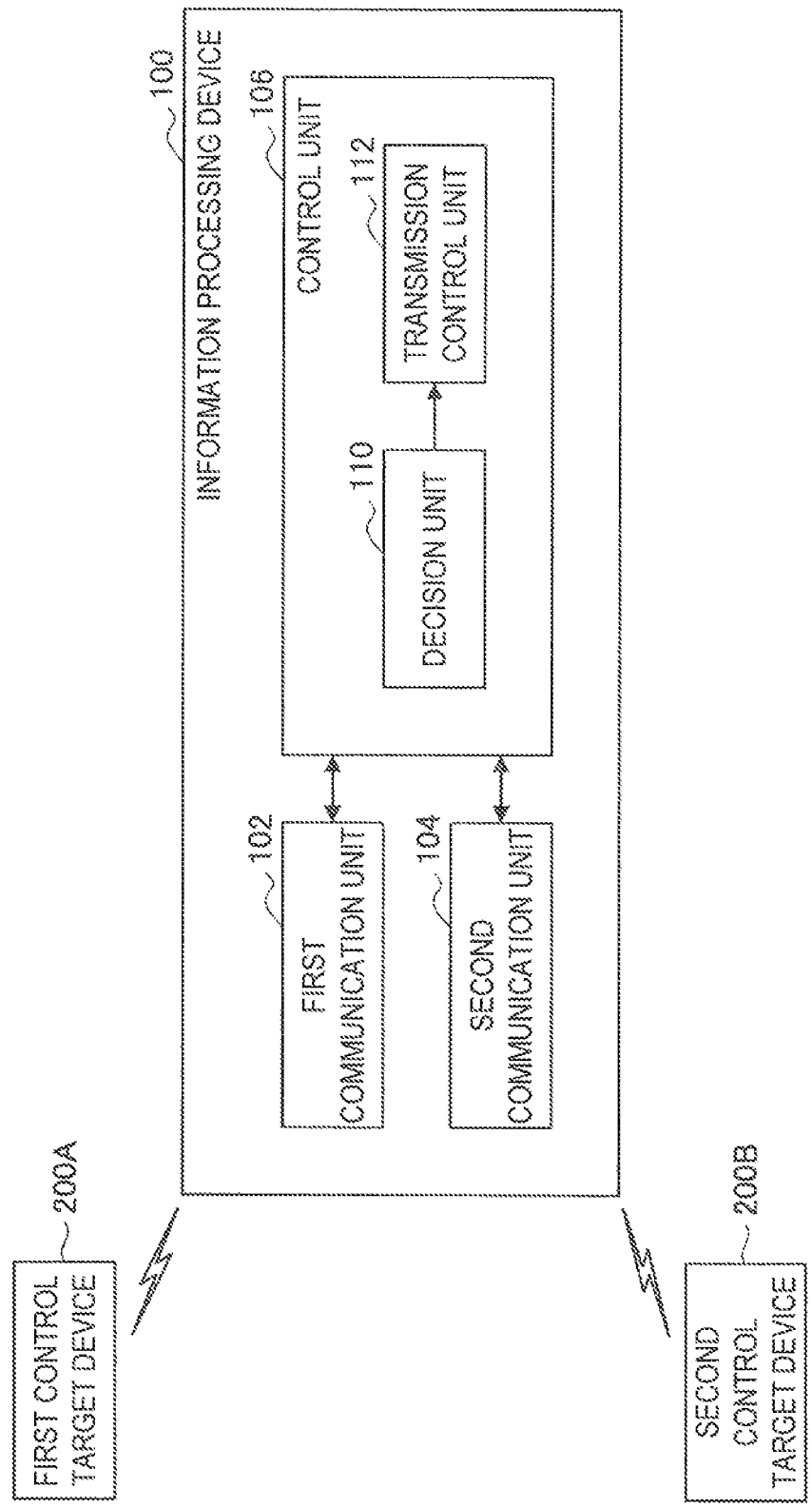
FIG. 12 is a block diagram showing an example of a configuration of an information processing device according to the embodiment.

Hereinafter, a preferred embodiment of the present invention will be described in detail with reference to the appended drawings. Note that, in this specification and the drawings, elements that have substantially the same function and structure are denoted with the same reference signs, and repeated explanation is omitted.

In addition, hereinafter, description will be provided in the following order.

1. Information processing method according to the embodiment

2. Information processing device according to the embodiment

3. Program according to the embodiment (Information Processing Method According to the Embodiment)

Before a configuration of an information processing device according to the present embodiment is described, first, an information processing method according to the present embodiment will be described. Hereinafter, the information processing method according to the present embodiment will be described exemplifying a case in which an information processing device according to the present embodiment performs a process relating to the information processing method according to the present embodiment.

[1] Overview of the Information Processing Method According to the Present Embodiment As described above, even if, for example, the technology described in Patent Literature 1 or the technology that relates to the connection handover specification is used, control target devices are not caused to perform communication at all times.

Thus, based on process capability information acquired from at least one of a first control target device and a second control target device which are target devices to be caused to perform wireless communication through a first communication path that is formed based on a first communication scheme, the information processing device according to the present embodiment decides a control target device to which connection information of the other control target device is transmitted between the first control target device and the second control target device (decision process). Then, the information processing device according to the present embodiment transmits the connection information of the other control target device to the decided control target device (a control target device to which the connection information of the other control target device is transmitted) (transmission control process).

Here, the first communication path according to the present embodiment is a communication path that is formed based on a communication scheme that enables the information processing device according to the present embodiment and a control target device to communicate with each other one to one without requiring, for example, a special connection setting made by a user. As the first communication path according to the present embodiment, for example, the communication path that is formed based on NFC which uses a carrier wave of a predetermined frequency such as 13.56 [MHz] for communication is exemplified. Note that the first communication path according to the present embodiment is not limited to the above. The first communication path according to the present embodiment may be, for example, a communication path that is formed based on infrared-ray communication that uses infrared rays for communication. Hereinbelow, the case in which the first communication path according to the present embodiment is the communication path that is formed based on NFC will be exemplified.

In addition, the process capability information according to the present embodiment is data indicating whether or not data received through the first communication path can be processed. As the process capability information according to the present embodiment, for example, a flag which indicates whether or not data received through the first communication path can be processed is exemplified. Note that the process capability information according to the present embodiment is not limited to the above, and may be arbitrary data as long as the data indicates whether or not data received through the first communication path can be processed.

By acquiring capability information from each of the first control target device and the second control target device through the first communication path of which, for example, a session has been established, the information processing device according to the present embodiment acquires at least one piece of the process capability information of the first control target device and the process capability information of the second control target device.

The capability information according to the present embodiment is data (or a data group) that indicates a capability relating to communication. As a capability relating to communication indicated by the capability information according to the present embodiment, for example, a process capability that indicates whether or not data received through the first communication path according to the present embodiment can be processed and a communication capability that indicates a corresponding communication scheme (a different communication scheme from the communication scheme that forms the first communication path) are exemplified.

Here, when the capability information according to the present embodiment is one piece of data and the process capability information according to the present embodiment is included in the capability information according to the present embodiment, the process capability information according to the present embodiment is a part of data constituting the data. When the capability information according to the present embodiment is one piece of data and the process capability information according to the present embodiment is included in the capability information according to the present embodiment, the information processing device according to the present embodiment acquires the process capability information according to the present embodiment by acquiring the capability information according to the present embodiment through the first communication path.

In addition, when the capability information according to the present embodiment is a data group and the process capability information according to the present embodiment is included in the capability information according to the present embodiment, the process capability information according to the present embodiment is data constituting the data group. When the capability information according to the present embodiment is a data group and the process capability information according to the present embodiment is included in the capability information according to the present embodiment, the information processing device according to the present embodiment acquires the process capability information according to the present embodiment in, for example, communication through the first communication path in which the capability information according to the present embodiment is acquired. In addition, when the capability information according to the present embodiment is a data group and the process capability information according to the present embodiment is included in the capability information according to the present embodiment, the information processing device according to the present embodiment may acquire the process capability information according to the present embodiment in, for example, communication through the first communication path of a separate transaction from communication relating to acquisition of connection information according to the present embodiment (which will be described later).

When the process capability information according to the present embodiment is included in the capability information according to the present embodiment, the information processing device according to the present embodiment specifies the process capability of a control target device which corresponds to the capability information using the process capability information according to the present embodiment included in the capability information according to the present embodiment. In addition, when the process capability information according to the present embodiment is not included in the capability information according to the present embodiment, the information processing device according to the present embodiment specifies a process capability of a control target device which corresponds to the capability information as the device assumes that, for example, the control target device which corresponds to the capability information does not have the process capability of data received through the first communication path. In addition, the information processing device according to the present embodiment specifies the communication capability of a control target device which corresponds to the capability information using the connection information (to be described later) according to the present embodiment included in the capability information according to the present embodiment.

In addition, a method used by the information processing device according to the present embodiment to acquire process capability information of at least one of process capability information of the first control target device and process capability information of the second control target device is not limited to the above.

For example, the process capability information according to the present embodiment may be acquired in communication which relates to establishment of a session of the first communication path with at least one of the first control target device and the second control target device. As communication which relates to establishment of a session of the first communication path according to the present embodiment when the first communication path is a communication path formed based on NFC, for example, "communication performed from the start of communication relating to polling until establishment of a session" is exemplified. A specific example of a process relating to the communication that relates to the establishment of a session of the first communication path according to the present embodiment will be described later.

Hereinbelow, processes of the information processing method according to the present embodiment will be described mainly exemplifying a case in which the information processing device according to the present embodiment acquires process capability information of at least one of process capability information of the first control target device and process capability information of the second control target device by acquiring capability information from each of the first control target device and the second control target device through the first communication path.

In addition, the connection information according to the present embodiment is data for starting communication through a second communication path that is formed based on a different communication scheme from the communication scheme for forming the first communication path. When the capability information according to the present embodiment is one piece of data, the connection information according to the present embodiment is a part of data constituting the data, and when the capability information according to the present embodiment is a data group, the connection information according to the present embodiment is data constituting the data group. When the capability information according to the present embodiment is one piece of data, the information processing device according to the present embodiment acquires connection information by acquiring capability information through the first communication path. In addition, when the capability information according to the present embodiment is a data group and the process capability information according to the present embodiment is included in the capability information according to the present embodiment, the information processing device according to the present embodiment may acquire connection information in, for example, communication through the first communication path for acquiring the process capability information according to the present embodiment, or may acquire connection information in communication through the first communication path of a separate transaction from communication which relates to acquisition of the process capability information according to the present embodiment.

The second communication path according to the present embodiment is a communication path formed based on a communication scheme in which, for example, a predetermined connection setting is necessary for communication between the information processing device according to the present embodiment and each of control target devices one to one. As the second communication path according to the present embodiment, for example, wireless communication using IEEE 802.15.1, wireless communication using a wireless LAN (Local Area Network) such as IEEE 802.11b (which may be called "Wi-Fi"), wireless communication based on ZigBee (a registered trademark), wireless communication based on ANT+, wireless communication based on TransferJet (a registered trademark), and the like are exemplified.

FIG. 1 is a descriptive diagram showing an example of content represented by capability information according to the present embodiment. Herein, FIG. 1 shows an example of capability information when the first communication path is a communication path formed based on NFC and a control target device which corresponds to the capability information shown in FIG. 1 has a communication capability of performing communication using a plurality of communication schemes which can form the second communication path. In addition, FIG. 1 shows an example of capability information when the process capability information according to the present embodiment is included in the capability information according to the present embodiment.

Referring to FIG. 1, the capability information according to the present embodiment has, for example, "device name (nickname)," "possibility of processing data received through NFC" (A shown in FIG. 1), "NFC profile information," "wireless communication interface information 1" (B1 shown in FIG. 1), "wireless communication interface information 2" (B2 shown in FIG. 1), . . . , "application information," . . . , and the like. Here, the "possibility of processing data received through NFC" indicated by A of FIG. 1 corresponds to the process capability information according to the present embodiment. Note that, as "data received through NFC" according to the present embodiment, for example, data received by a control target device according to the present embodiment, data received by an external device such as an NFC tag and acquired by a control target device according to the present embodiment from the external device, and the like are exemplified. In addition, "wireless communication interface information 1," "wireless communication interface information 2," . . . , indicated respectively by B1, B2, . . . of FIG. 1 correspond to the connection information according to the present embodiment.

The information processing device according to the present embodiment can specify a process capability and a communication capability of each control target device by, for example, acquiring the capability information shown in FIG. 1 from each of the first control target device and the second control target device.

Note that the capability information according to the present embodiment is not limited to the data of the content shown in FIG. 1. The capability information according to the present embodiment may not include, for example, one or two or more of "device name (nickname)," "NFC profile information," "application information," . . . shown in FIG. 1. In addition, the capability information according to the present embodiment may not include "possibility of processing data received through NFC" shown in A of FIG. 1, i.e., the process capability information according to the present embodiment. In addition, although FIG. 1 shows an example in which a plurality of pieces of connection information are included in the capability information according to the present embodiment (an example showing that a control target device has communication capabilities which correspond to a plurality of communication schemes), the capability information according to the present embodiment may include one piece of connection information. In addition, FIG. 1 shows the example in which the capability information according to the present embodiment is one piece of data, however, the capability information according to the present embodiment may be a data group constituted by data indicating each piece of content shown in FIG. 1 (or content that relates to the above modified example). Furthermore, it is needless to say that the connection information according to the present embodiment is not limited to the data indicating the content shown in B1 of FIG. 1.

Hereinbelow, a decision process and a transmission control process of the information processing method according to the present embodiment will be described in more detail. Note that, hereinbelow, processes of the information processing method according to the present embodiment will be described mainly exemplifying a case in which the information processing device according to the present embodiment acquires process capability information of at least one of process capability information of the first control target device and process capability information of the second control target device by acquiring capability information from each of the first control target device and the second control target device through the first communication path.

(1) Decision Process

The information processing device according to the present embodiment acquires capability information of each of the first control target device and the second control target device by performing communication with each of the first control target device and the second control target device through the first communication path via, for example, a first communication unit (to be described later) included in the information processing device according to the present embodiment or an external communication device connected to the information processing device according to the present embodiment.

To be more specific, the information processing device according to the present embodiment causes the first communication unit (to be described later) or the like to transmit, for example, a capability information transmission request that includes a transmission command for causing capability information to be transmitted and thereby acquires the capability information transmitted from the control target devices in response to the capability information transmission request. In addition, the information processing device according to the present embodiment may notify a user of, for example, a start notification for starting communication through the first communication path. Here, as the start notification according to the present embodiment, for example, a notification requesting the user to perform a touch operation on a control target device (an example of an operation for setting a distance of the control target device to the information processing device according to the present embodiment or to the external communication device to be a communicable distance; the same applies hereinafter) is exemplified (an example of the case in which the first communication path is a communication path formed based on NFC).

The information processing device according to the present embodiment notifies the user of the start notification or various notifications to be described later using a visual notification method in which, for example, text or an image is used, or an auditory notification method in which sound (including music, a beep sound, and the like; the same applies hereinafter) is used. In addition, as a target to be caused to perform notification by the information processing device according to the present embodiment, for example, a display unit (to be described later) or an audio output unit (to be described later) included in the device itself (the information processing device according to the present embodiment) and/or an external device such as an external display device or an external audio output device are exemplified.

Here, as a capability information acquisition source from which the information processing device according to the present embodiment acquires the capability information, for example, control target devices are exemplified, however, the capability information acquisition source according to the present embodiment is not limited thereto. The capability information acquisition source according to the present embodiment may be, for example, an NFC tag or a non-contact IC card affixed to a control target device, or a single-body NFC tag or a non-contact IC card that is not affixed to a control target device. When the capability information acquisition source according to the present embodiment is an NFC tag or the like described above, the process capability information included in the capability information indicates that, for example, data received through the first communication path is difficult to process. In addition, even when the capability information acquisition source according to the present embodiment is a control target device, there can be cases in which data received through the first communication path is difficult to process. To be more specific, as a case in which the information processing device according to the present embodiment has difficulty processing data received through the first communication path, for example, the following cases are exemplified.

A case in which a control target device does not have means for exchanging data with an NFC tag or the like (which corresponds to a case in which the "condition for being able to receive connection information" is not satisfied)

A case in which a program executed by a control unit (to be described later) or the like included in a control target device fails to deal with handover using an NFC interface (which corresponds to a case in which the "condition for being able to analyze received connection information" is not satisfied, and/or a case in which the "condition for being able to start different communication based on analyzed connection information" is not satisfied)

When the capability information of each of the first control target device and the second control target device is acquired, the information processing device according to the present embodiment decides a control target device to which connection information of the other control target device is to be transmitted (which may be referred to hereinafter as a "transmission target control target device") between the first control target device and the second control target device based on process capability information that can be included in the acquired capability information. Here, by deciding the transmission target control target device to which the connection information is transmitted, a direction in which the connection information is moved is decided, and a communication scheme that forms the second communication path is decided with the connection information to be transmitted. In addition, the type of information can be decided with information included in the connection information to be transmitted.

Note that, as described above, the information processing device according to the present embodiment can also acquire the process capability information in communication that relates to the establishment of a session of the first communication path with at least one control target device between the first control target device and the second control target device. When the process capability information is acquired in the communication that relates to the establishment of a session of the first communication path, the information processing device according to the present embodiment decides a transmission target control target device between the first control target device and the second control target device based on the acquired process capability information.

To be more specific, the information processing device according to the present embodiment decides a transmission target control target device based on the acquired process capability information. For example, when both of the process capability information of the first control target device and the process capability information of the second control target device are acquired such as when the process capability information is included in both of the capability information of the first control target device and the capability information of the second control target device, the information processing device according to the present embodiment determines a combination of presence or absence of process capabilities of the first control target device and the second control target device with respect to data received through the first communication path based on the process capability information of the first control target device and the process capability information of the second control target device. When, for example, the capability information shown in FIG. 1 is acquired, the information processing device according to the present embodiment determines a combination of presence or absence of the process capabilities of data received through the first communication path based on, for example, "possibility of processing data received through NFC" (an example of process capability information) shown in A of FIG. 1. Then, the information processing device according to the present embodiment decides a transmission target control target device between the first control target device and the second control target device based on the determined combination.

Here, as the determined combination, for example, a first combination to a third combination described below are exemplified.

First combination: A combination in which either the first control target device or the second control target device has a process capability with respect to data received through the first communication path Second combination: A combination in which both of the first control target device and the second control target device have process capabilities with respect to data received through the first communication path Third combination: A combination in which neither the first control target device nor the second control target device has a process capability with respect to data received through the first communication path In addition, when the process capability information of one control target device is acquired and the process capability information of the other control target device is not acquired, for example, when the process capability information is included in the capability information of one control target device and the process capability information is not included in the capability information of the other control target device, the information processing device according to the present embodiment assumes that the other control target device does not have the process capability with respect to data received through the first communication path. In addition, in the case described above, the information processing device according to the present embodiment determines a combination of presence or absence of process capabilities of the first control target device and the second control target device with respect to data received through the first communication path based on the assumed process capability of the other control target device with respect to data received through the first communication path and the process capability information of one control target device. Then, the information processing device according to the present embodiment decides a transmission target control target device based on the determined combination.

Here, as the combination determined when the process capability information of one control target device is acquired and the process capability information of the other control target device is not acquired, the first combination or the third combination is exemplified.

In addition, when both of the process capability information of the first control target device and the process capability information of the second control target device are not acquired, for example, when the process capability information is not included in either of the capability information of the first control target device or the capability information of the second control target device, the information processing device according to the present embodiment assumes that neither the first control target device nor the second control target device has the process capabilities with respect to data received through the first communication path. In addition, in this case, the information processing device according to the present embodiment determines a combination of presence or absence of process capabilities of the first control target device and the second control target device with respect to data received through the first communication path based on the assumed process capability of the first control target device with respect to data received through the first communication path and the assumed process capability of the second control target device with respect to data received through the first communication path. Then, the information processing device according to the present embodiment decides a transmission target control target device based on the determined combination.

Here, as the combination determined when the process capability information of the first control target device and the process capability information of the second control target device are not acquired, the third combination is exemplified.

Hereinbelow, an example of each of a decision process in the first combination according to the present embodiment, a decision process in the second combination according to the present embodiment, and a decision process in the third combination according to the present embodiment will be described in detail.

(1-1) First Example of the Decision Process: Decision Process in the First Combination When one of the first control target device and the second control target device has the process capability with respect to data received through the first communication path, for example, when process capability information of one control target device indicates that data received through the first communication path can be processed and process capability information of the other control target device does not indicate that data received through the first communication path can be processed, the information processing device according to the present embodiment decides the one control target device to be a transmission target control target device.

For example, when the first control target device has the process capability with respect to data received through the first communication path and the second control target device does not have the process capability with respect to data received through the first communication path, the information processing device according to the present embodiment decides the first control target device to be a transmission target control target device. In addition, for example, when the second control target device has the process capability with respect to data received through the first communication path and the first control target device does not have the process capability with respect to data received through the first communication path, the information processing device according to the present embodiment decides the second control target device to be a transmission target control target device.

In the first combination, for example, by deciding the transmission target control target device as described above, the transmission target control target device can receive and process connection information of the other control target device transmitted in a transmission control process to be described later. Thus, by deciding the transmission target control target device as described above in the first combination, for example, the transmission target control target device can perform communication with the other control target device using the connection information through the second communication path.

In other words, by deciding the transmission target control target device as described above in the first combination, for example, the first control target device and the second control target device can perform communication through the second communication path even when either of the first control target device or the second control target device is a device to which an NFC tag or the like is affixed. In addition, it is not necessary for a user to be aware of an authentication process and a setting process for the communication between the first control target device and the second control target device through the second communication path.

Thus, the information processing device according to the present embodiment can control communication performed between the control target devices by, for example, deciding the transmission target control target device as described above in the first combination.

(1-2) Second Example of the Decision Process: Decision Process in the Second Combination When both of the first control target device and the second control target device have the process capabilities with respect to data received through the first communication path, both of the first control target device and the second control target device can receive and process connection information of the other control target device transmitted in the transmission control process to be described later.

Thus, the information processing device according to the present embodiment decides, for example, a control target device that corresponds to process capability information that is acquired later between the first control target device and the second control target device as a transmission target control target device.

Here, when the control target device that corresponds to process capability information that is acquired later is decided as a transmission target control target device, for example, the information processing device according to the present embodiment can transmit connection information of the other control target device in communication through the first communication path that relates to acquisition of the process capability information and then can cause the transmission target control target device to process the connection information in the transmission control process to be described later. In addition, when the transmission target control target device can receive and process the connection information of the other control target device in the communication through the first communication path that relates to the acquisition of the process capability information, for example, it is not necessary for the information processing device according to the present embodiment and the transmission target control target device to start the communication through the first communication path again (or it is highly likely that starting the communication through the first communication path again is not necessary). For this reason, when, for example, the first communication path is a communication path formed based on NFC, the information processing device according to the present embodiment can cause the transmission target control target device to process the connection information of the other control target information without causing a user to perform a touch operation with respect to the transmission target control target device again.

Note that, regardless of whether the first communication path is a communication path formed based on NFC, the information processing device according to the present embodiment may cause the connection information of the other control target device to be transmitted in communication through the first communication path that has been started again, rather than in communication through the first communication path that relates to the acquisition of the process capability information in the transmission control process to be described later. When the connection information of the other control target device is transmitted in the communication through the first communication path that has been started again, the information processing device according to the present embodiment notifies the user of, for example, a start notification for starting the communication through the first communication path.

As described above, by deciding a control target device that corresponds to the process capability information that is acquired later in the second combination as a transmission target control target device, the information processing device according to the present embodiment can control communication performed between control target devices.

Note that the decision process in the second combination is not limited to the above. For example, the information processing device according to the present embodiment can decide a transmission target control target device based on connection information included in the capability information of the first control target device and connection information included in the capability information of the second control target device.

The information processing device according to the present embodiment decides a transmission target control target device based on, for example, a valid flag included in the connection information as shown in B1 of FIG. 1 and using the connection information of which the valid flag is valid (in the example shown in FIG. 1, the connection information in which the valid flag is "Enable").

Note that the connection information used by the information processing device according to the present embodiment is not limited to the connection information of which the valid flag is valid. For example, the information processing device according to the present embodiment may determine valid connection information based on other data included in the connection information such as "status information," "term of validity information," or "possibility of processing data received through the interface" shown in B1 of FIG. 1, and then decide a transmission target control target device using the connection information determined to be valid. Here, there are cases in which, in order to reduce power consumption, the wireless communication function of a device that has a communication interface is selectively activated as necessary, rather than being activated at all times. The status information according to the present embodiment is data indicating such an activation state of the wireless communication function. In addition, the term of validity information according to the present embodiment is data that controls a valid state of connection information (a state in which use of the connection information is allowed). As the term of validity information according to the present embodiment, data indicating the number of valid touches that controls the valid state with the number of touch operations, valid time data that controls the valid state depending on a period, and the like are exemplified. When, for example, the term of validity information is data indicating that a valid time is one minute, a state of the connection information indicates that the connection reception time taken for a control target device that corresponds to the term of validity information to perform the communication through the second communication path is one minute. In addition, "possibility of processing data received through the interface" shown in B1 of FIG. 1 is data indicating whether or not data received through the second communication path formed using the connection information can be processed. When, for example, the "possibility of processing data received through the interface" (shown in B1 of FIG. 1) included in the connection information does not indicate that it is difficult to process data received through the second communication path, the information processing device according to the present embodiment does not determine the connection information as valid connection information. Note that, as "data received through the interface" according to the present embodiment, for example, data received by the control target device according to the present embodiment, data received by an external interface that is an external communication interface of the control target device according to the present embodiment and acquired from the external interface by the control target device according to the present embodiment, and the like are exemplified.

In addition, with respect to communication schemes that can form the second communication path, there can be various communication schemes, for example, a communication scheme such as IEEE 802.15.1 in which authentication is necessary for starting communication, a communication scheme such as IEEE 802.15.1 or ZigBee (a registered trademark) in which roles for communication such as a master (entity that actively performs communication) and a slave (entity that passively performs communication) are decided, and the like. The information processing device according to the present embodiment decides a transmission target control target device so that communication through the second communication path is normally established through the decision of the transmission target control target device based on the connection information.

For example, when connection information with respect to the communication scheme in which authentication is necessary for starting communication is transmitted in the transmission control process that will be described later, the information processing device according to the present embodiment decides both of the first control target device and the second control target device as transmission target control target devices. In this case, the information processing device according to the present embodiment transmits connection information of the other control target device to both of the first control target device and the second control target device in the transmission control process that will be described later. Thus, the first control target device and the second control target device perform authentication using, for example, the "authentication scheme" and "authentication information" included in the connection information shown in B1 of FIG. 1, and then can perform communication through the second communication path.

In addition, when connection information with respect to the communication scheme in which roles for communication such as a master and a slave are decided is transmitted in the transmission control process that will be described later, for example, the information processing device according to the present embodiment specifies a control target device which corresponds to a master based on data indicating roles for communication included in the connection information (for example, a flag indicating a master or a slave, or the like). Then, the information processing device according to the present embodiment decides the specified control target device as a transmission target control target device out of the first control target device and the second control target device.

Here, when both of the first control target device and the second control target device correspond to masters, the information processing device according to the present embodiment decides a control target device having a high priority as a transmission target control target device based on, for example, priorities set for each of the first control target device and the second control target device. Here, the priorities set according to the present embodiment may be set in advance or set (or reset) based on a user operation or the like. Note that a decision method of a transmission target control target device when both of the first control target device and the second control target device are masters is not limited to the above. For example, the information processing device according to the present embodiment may decide a control target device that corresponds to the capability information acquired later as a transmission target control target device when both of the first control target device and the second control target device are masters.

By deciding a transmission target control target device based on connection information as described above, for example, the transmission target control target device can receive and process the connection information of the other control target device transmitted in the transmission control process that will be described later. In addition, as the transmission target control target device is decided based on connection information, the transmission target control target device can perform normal communication through the second communication path.

Thus, by deciding the transmission target control target device based on the connection information in the second combination as described above, the information processing device according to the present embodiment can control communication between the control target devices.

(1-3) Third Example of the Decision Process: Decision Process in the Third Combination When neither the first control target device nor the second control target device has process capabilities with respect to data received through the first communication path, it is not possible to decide a transmission target control target device even if process capability information indicating whether data received through the first communication path can be processed is used.

Thus, based on the connection information of the first control target device, the information processing device according to the present embodiment determines presence or absence of a process capability of the first control device with respect to data received through a communication path that is formed based on the connection information. In addition, based on the connection information of the second control target device, the information processing device according to the present embodiment determines presence or absence of the second control target device with respect to data received through a communication path that is formed based on the connection information. Then, the information processing device according to the present embodiment decides a transmission target control target device based on a "determination result of the presence or absence of a process capability with respect to data" or based on "the determination result and an order of acquiring capability information, set priorities, or a user operation."

To be more specific, based on data that is included in the acquired connection information of each control target device indicating whether data received through the second communication path formed using the connection information can be processed (for example, "possibility of processing data received through the interface" shown in B1 of FIG. 1), the information processing device according to the present embodiment determines presence or absence of a process capability of data received through a communication path that is formed based on the connection information of each control target device. When the determination result of the presence or absence of a process capability with respect to data indicates that one control target device has the process capability with respect to data received through a communication path that is formed based on the connection information and the other control target device does not have the process capability with respect to data received through a communication path that is formed based on the connection information, the information processing device according to the present embodiment decides the one control target device as a transmission target control target device.

In addition, when the determination result of the presence or absence of a process capability with respect to data indicates that neither the first control target device nor the second control target device has a process capability with respect to data received through a communication path that is formed based on the connection information, if either of the first control target device and the second control target device is decided as a transmission target control target device, it is difficult for the transmission target control target device to process the connection information of the other control target device which is transmitted in the transmission control process that will be described later. Thus, in this case, the information processing device according to the present embodiment notifies a user of, for example, an error indicating that the first control target device and the second control target device are not able to perform communication. Here, as an error notification according to the present embodiment, for example, displaying an error screen that includes an error message or an error image on a display screen, outputting a sound indicating an error message, or the like is exemplified.

In addition, when the determination result of the presence or absence of a process capability with respect to data indicates that both of the first control target device and the second control target device have process capabilities with respect to data received through a communication path that is formed based on the connection information, the information processing device according to the present embodiment decides a transmission target control target device based on, for example, an order of acquiring process capability information, set priorities, or a user operation.

When a transmission target control target device is decided based on the order of acquiring process capability information, the information processing device according to the present embodiment decides, for example, a control target device that corresponds to the process capability information that is acquired later as the transmission target control target device. Note that the information processing device according to the present embodiment may decide, for example, a control target device that corresponds to the process capability information that is acquired earlier as the transmission target control target device.

In addition, when a transmission target control target device is decided based on the set priorities, the information processing device according to the present embodiment decides a control target device having a high priority as the transmission target control target device based on, for example, the priorities set for each of the first control target device and the second control target device. Note that a priority according to the present embodiment is not limited to a priority set for the first control target device and the second control target device. The priority according to the present embodiment may be, for example, a priority set for the communication scheme that relates to the second communication path. When the priority according to the present embodiment is the priority set for the communication scheme that relates to the second communication path, the information processing device according to the present embodiment decides a transmission target control target device based on, for example, connection information that responds to a communication scheme having a higher priority as in the decision process of the second example described above.

In addition, when a transmission target control target device is decided based on a user operation, the information processing device according to the present embodiment notifies the user of the notification indicating that, for example, a selection operation of selecting a transmission target control target device is performed. As a notification indicating that a selection operation according to the present embodiment is performed, for example, displaying a selection screen on which any of the first control target device and the second control target device can be selected on the display screen or the like is exemplified. Then, based on, for example, an operation signal transferred from an operation unit (to be described later) according to a selection operation, or an operation signal transmitted from an external operation device such as a remote controller according to a selection operation, the information processing device according to the present embodiment decides a control target device represented by the operation signal as the transmission target control target device.

Here, when neither the first control target device nor the second control target device has a process capability with respect to data received through the first communication path, it is difficult for both of the first control target device and the second control target device to receive, through the first communication path, and process the connection information of the other control target device transmitted in the transmission control process that will be described later. Thus, in this case, the information processing device of the present embodiment causes the connection information of the other control target device to be transmitted to the transmission target control target device using communication through a third communication path that is different from the first communication path in the transmission control process that will be described later. Here, the third communication path according to the present embodiment is a communication path formed based on a communication scheme represented by the connection information included in the capability information of each control target device. As the third communication path according to the present embodiment, for example, wireless communication that uses IEEE 802.15.1, wireless communication that uses a wireless LAN of IEEE 802.11b, or the like is exemplified.

When the first control target device is decided as a transmission target control target device, the information processing device according to the present embodiment can perform communication with the first control target device through the third communication path using the connection information included in the capability information of the first control target device. In addition, when the second control target device is decided as a transmission target control target device, the information processing device according to the present embodiment can perform communication with the second control target device through the third communication path using the connection information included in the capability information of the second control target device. Thus, if either of the first control target device and the second control target device is decided as a transmission target control target device, the transmission target control target device can receive and process the connection information of the other control target device transmitted in the transmission control process that will be described later.

Therefore, by deciding a transmission target control target device as described above in the third combination, the information processing device according to the present embodiment can control communication between the control target devices.

The information processing device according to the present embodiment performs, for example, the process relating to the first example, the process relating to the second example, or the process relating to the third example based on the determination result of the combination of presence or absence of a process capability of data received through the first communication path. By performing the process relating to the first example, the process relating to the second example, or the process relating to the third example, the information processing device according to the present embodiment can decide a transmission target control target device.

Note that a decision process of the information processing device according to the present embodiment is not limited to the processes relating to the first example to the third example.

(1-4) Fourth Example of the Decision Process

As shown in FIG. 1, the capability information according to the present embodiment includes, for example, a plurality of pieces of connection information. The information processing device according to the present embodiment decides, for example, the communication scheme for the second communication path based on the connection information included in the capability information of the first control target device and the connection information included in the capability information of the second control target device. To be more specific, the information processing device according to the present embodiment compares the communication scheme represented by valid connection information included in the capability information of the first control target device and the communication scheme represented by valid connection information included in the capability information of the second control target device, and then decides a communication scheme that both of the control target devices correspond to as the communication scheme for the second communication path. In addition, when there are a plurality of communication schemes that both of the control target devices correspond to, the information processing device according to the present embodiment decides, for example, a communication scheme having a higher priority as a communication scheme for the second communication path according to set priorities. Here, the information processing device according to the present embodiment determines valid connection information based on data included in the connection information, for example, the "valid flag," "status information," "term of validity information," and "possibility of processing data received through the interface" shown in B1 of FIG. 1.

In addition, the information processing device according to the present embodiment causes the connection information with respect to the decided communication scheme to be transmitted to the transmission target control target device in the transmission control process that will be described later.

Thus, by deciding the communication scheme that both of the control target devices respond to as the communication scheme for the second communication path as described above, the information processing device according to the present embodiment can cause the first control target device and the second control target device to perform normal communication through the second communication path.

In addition, when the decided communication scheme has a communication distance shorter than a predetermined distance that has been set, the information processing device according to the present embodiment may notify the user of a notification indicating that the control target devices should be brought close to each other. Here as the predetermined distance that has been set, for example, a preset distance such as a communication distance of a communication scheme that forms the first communication path, or a distance that is set (or reset) with a user operation or the like is exemplified. In addition, when the decided communication scheme is a communication scheme having a communication speed faster than that of the communication scheme that forms the first communication path and a communication distance shorter than that of the communication scheme that forms the first communication path (for example, TransferJet (a registered trademark) or the like), the information processing device according to the present embodiment may notify the user of a notification indicating that the control target devices should be brought close to each other. As the notification indicating that the control target devices according to the present embodiment should be brought close to each other, for example, displaying a guide screen instructing that the control target devices be brought close to each other on the display screen, outputting a guide sound indicating that the control target devices should be brought close to each other, or the like is exemplified.

(1-5) Fifth Example of the Decision Process

In addition, the information processing device according to the present embodiment may notify the user of a communication scheme in which the first control target device and the second control target device can communicate with each other based on, for example, the connection information included in the capability information of the first control target device and the connection information included in the capability information of the second control target device. When the user is notified of the communication scheme in which the first control target device and the second control target device can communicate with each other, the information processing device according to the present embodiment decides a communication scheme for the second communication path based on, for example, a user operation.

Here, as a notification of the communication scheme in which the first control target device and the second control target device can communicate with each other, for example, displaying, on the display screen, a selection screen on which one communication scheme can be selected from communication schemes that both of the control target devices respond to, or the like is exemplified. Based on, for example, an operation signal transferred from the operation unit (to be described later) according to a user operation or an operation signal transmitted from an external operation device such as a remote controller according to a user operation, the information processing device according to the present embodiment decides a communication scheme indicated by the operation signal as the communication scheme for the second communication path.

In addition, the information processing device according to the present embodiment causes the connection information with respect to the decided communication scheme to be transmitted to the transmission target control target device in the transmission control process that will be described later.

As described above, by deciding the communication scheme based on the user operation as the communication scheme for the second communication path between the communication schemes that both of the control target devices respond to, the information processing device according to the present embodiment can cause the first control target device and the second control target device to perform normal communication through the second communication path.

(1-6) Sixth Example of the Decision Process

In addition, the capability information according to the present embodiment can include information (data; the term of validity information shown in B1 of FIG. 1) indicating the term of validity (for example, a condition with regard to a number or time) as shown in FIG. 1. When connection information to be transmitted to a transmission target control target device (connection information of the other control target device) is not transmitted thereto within the term of validity indicated by information indicating the term of validity included in the connection information, the information processing device according to the present embodiment may set the acquired connection information to be in an invalid state. In addition, the information processing device according to the present embodiment may give a notification with respect to the term of validity represented by the information of the term of validity (for example, a notification indicating within how many minutes a touch operation or the like should be performed, a notification indicating the remaining number of valid touches, etc.).

Here, the information processing device according to the present embodiment sets the connection information to be in an invalid state by setting, for example, a valid flag included in the connection information to be in an invalid state (for example, setting the flag to "Disable" in the example of B1 of FIG. 1), however, a process of setting the connection information by the information processing device according to the present embodiment is not limited to the above. For example, the information processing device according to the present embodiment may set the acquired connection information to be in the invalid state by deleting the acquired connection information.

By setting the acquired connection information to be in the invalid state, the information processing device according to the present embodiment can restrict communication between the control target devices based on connection information of which the term of validity has expired. Thus, by setting the acquired connection information to be in the invalid state, the information processing device according to the present embodiment can control communication between the control target devices more strictly.

In addition, the information processing device according to the present embodiment may notify the user of the fact that the term of validity of the connection information has been terminated when, for example, the acquired connection information is set to be in the invalid state. Here, as a notification indicating that the term of validity of the connection information according to the present embodiment has been terminated, for example, displaying an alert screen indicating that the term of validity of the connection information has been terminated on the display screen, displaying a guide screen that instructs to perform a touch operation on each of the control target devices again, or the like is exemplified.

(1-7) Seventh Example of the Decision Process

In addition, there are also cases in which, for example, the first control target device according to the present embodiment and the second control target device according to the present embodiment are not able to perform communication through the second communication path. As the case in which it is difficult to perform the communication through the second communication path, for example, when the first control target device according to the present embodiment and the second control target device according to the present embodiment do not include a communication interface that responds to a common communication scheme, or are not able to use the communication interface that responds to a common communication scheme, or when applications that use the communication interface are not compatible with each other is exemplified.

The information processing device according to the present embodiment determines whether or not the communication through the second communication path can be performed with reference to acquired capability information of each control target device (to be more specific, various kinds of data included in the capability information, for example, connection information, application information, and the like). Then, when the communication through the second communication path is determined not to be performed, the information processing device according to the present embodiment notifies the user of an error indicating that the first control target device and the second control target device are not able to perform the communication. Here, as an error notification according to the present embodiment, for example, displaying an error screen that includes an error message or an error image on the display screen, outputting a sound indicating an error message, or the like is exemplified.

(2) Transmission Control Process

When a transmission target control target device is decided in the process (1) (decision process) described above, the information processing device according to the present embodiment causes connection information of the other control target device to be transmitted to the decided transmission target control target device.

To be more specific, the information processing device according to the present embodiment causes the connection information to be transmitted through, for example, a communication path corresponding to the combination of presence or absence of the process capability of data received through the first communication path determined in the process (1) (decision process) described above.

(2-1) When the First Combination or the Second Combination is Determined in the Process (1) (Decision Process) Described Above When the first combination or the second combination is determined in the process (1) (decision process) described above, the transmission target control target device can receive and process the connection information using the first communication path. Thus, in this case, the information processing device according to the present embodiment causes the connection information to be transmitted using the first communication path.

Here, the first communication path that the information processing device according to the present embodiment uses to transmit the connection information may be a first communication path that relates to acquisition of process capability information, or a first communication path that has been formed again.

Note that, as described above, when the first communication path is a communication path formed based on NFC, for example, the information processing device according to the present embodiment can cause the transmission target control target device to process the connection information of the other control target device by transmitting the connection information through the first communication path that relates to acquisition of process capability information, without causing the user to perform a touch operation on the transmission target control target device again.

Thus, the information processing device according to the present embodiment causes the connection information to be transmitted using the first communication path that relates to acquisition of the process capability information when, for example, the connection information of the other control target device can be transmitted to the transmission target control target device through the first communication path on which the process capability information is acquired. In addition, when, for example, it is difficult to transmit the connection information of the other control target device to the transmission target control target device through the first communication path on which the process capability information is acquired, the information processing device according to the present embodiment causes the communication using the first communication path to be performed again to form the first communication path again. Then, the information processing device according to the present embodiment causes the connection information of the other control target device to be transmitted to the transmission target control target device using the first communication path that is formed again.

Here, as cases in which it is difficult to cause connection information to be transmitted to a transmission target control target device through the first communication path on which process capability information has been acquired, for example, the following cases of (a) to (e) are exemplified.

(a) a case in which the transmission target control target device decided in the process (1) (decision process) described above is a control target device between the first control target device and the second control target device which corresponds to process capability information that has been acquired earlier.

(b) a case in which the communication scheme used for performing P2P communication through the second communication path (the communication scheme that forms the second communication path) is a communication scheme in which nodes are in the master-slave relation as in, for example, IEEE 802.15.1 or ZigBee (a registered trademark).

(c) a case in which the communication scheme that forms the second communication path is a communication scheme that requires mutual authentication, in which authentication data (for example, the authentication scheme and authentication information shown in B1 of FIG. 1) necessary for the mutual authentication is exchanged.

(d) a case in which the communication scheme that forms the second communication path is a communication scheme that performs encryption of the communication path, in which session keys necessary for the encryption of the communication path are exchanged.

(e) a case in which, via the information processing device according to the present embodiment, status information (for example, the status information shown in B1 of FIG. 1) of one control target device is transferred to the other control target device, and the information processing device according to the present embodiment receives a signal that has been transmitted from the other control target device to request a change of status of the one control target device.

In the case (b) described above, the information processing device according to the present embodiment determines the master-slave relation between the nodes based on the connection information of each control target device in the process (1) (decision process) described above, and thereby decides a transmission target control target device. In addition, in the case (c) described above, the information processing device according to the present embodiment determines whether or not it is necessary for the control target devices to exchange authentication data for performing mutual authentication based on the connection information of each control target device in the process (1) (decision process) described above, and thereby decides a transmission target control target device. In addition, in the case (d) described above, the information processing device according to the present embodiment determines whether or not it is necessary for the control target devices to exchange session keys for encryption of the communication path based on the connection information of each control target device in the process (1) (decision process) described above, and thereby decides a transmission target control target device. In addition, in the case (e) described above, the information processing device according to the present embodiment decides a control target device which is a change target of status as a transmission target control target device based on, for example, a received signal that requests a change of status. In addition, as a determination result of each of (b) to (d) described above, when the transmission target control target device is the control target device that corresponds to the capability information that has been acquired earlier between the first control target device and the second control target device based on the decision result of (e) described above, the information processing device according to the present embodiment determines that it is difficult to cause the connection information to be transmitted to the transmission target control target device through the first communication path on which the capability information has been acquired.

Note that, when the connection information of the other control target device can be transmitted to the transmission target control target device through, for example, the first communication path on which the process capability information has been acquired, the information processing device according to the present embodiment can also perform communication through the first communication path again.

In addition, when the first communication path is formed again, the information processing device according to the present embodiment may notify the user of, for example, a start notification for starting the communication through the first communication path described above. In addition, in the case (c) described above, the user may be notified of the authentication result (for example, success or failure).

(2-2) When the Third Combination is Determined in the Process (1) (Decision Process) Described Above When the third combination is determined in the process (1) (decision process) described above, it is difficult for the transmission target control target device to receive and process the connection information through the first communication path. Thus, in such a case, the information processing device according to the present embodiment causes the connection information to be transmitted through a third communication path (a different communication path from the first communication path) that is based on the connection information.

The information processing device according to the present embodiment causes the connection information to be transmitted through, for example, a communication path corresponding to the combination of presence or absence of the process capability of data received through the first communication path determined in the process (1) (decision process) described above.

Note that the transmission control process in the information processing device according to the present embodiment is not limited to causing the connection information to be transmitted through the communication path that corresponds to the combination of presence or absence of the process capability with respect to data received through the first communication path which has been determined in the process (1) (decision process) described above. For example, the information processing device according to the present embodiment may cause the connection information to be transmitted in communication through the third communication path regardless of the determination result of the combination in the process (1) (decision process) described above.

In addition, the information processing device according to the present embodiment causes, for example, connection information that responds to the communication scheme decided in the process (1) (decision process) described above to be transmitted to the transmission target control target device.

The information processing device according to the present embodiment performs, for example, the process (1) (decision process) described above and the process (2) (transmission control process) described above as processes relating to the information processing method according to the present embodiment. Here, the information processing device according to the present embodiment decides a transmission target control target device (a control target device to which the connection information of the other control target device is to be transmitted) in the process (1) (decision process) described above, and causes the connection information of the other control target device to be transmitted to the decided transmission target control target device in the process (2) (transmission control process) described above. In addition, the transmission target control target device decided in the process (1) (decision process) described above is a control target device between the first control target device and the second control target device that can receive the connection information of the other control target device and process the connection information.

Thus, as the information processing device according to the present embodiment performs the process (1) (decision process) described above and the process (2) (transmission control process) described above, the transmission target control target device can perform communication with the other control target device through the second communication path using the connection information. In other words, as the information processing device according to the present embodiment performs the process (1) (decision process) described above and the process (2) (transmission control process) described above, the first control target device and the second control target device can perform communication with each other through the second communication path even when, for example, one or each of the first control target device and the second control target device is a device to which an NFC tag or the like is affixed.

Therefore, the information processing device according to the present embodiment can control the communication performed between the control target devices by performing the processes relating to the information processing method according to the present embodiment. In addition, as the information processing device according to the present embodiment controls the communication performed between the control target devices, various kinds of handover between the control target devices can be realized.

In addition, since the information processing method according to the present embodiment causes the connection information of the other control target device to be transmitted to the transmission target control target device, it is not necessary for the user to be aware of the authentication process or the setting process for the first control target device and the second control target device to perform the communication through the second communication path. Thus, the information processing method according to the present embodiment can enhance convenience for the user by performing the processes relating to the information processing method according to the present embodiment.

[2] Specific Examples of a Process Relating to the Information Processing Method According to the Present Embodiment Next, a process relating to the information processing method according to the present embodiment described above will be described in more detail. Hereinbelow, the process relating to the information processing method according to the present embodiment in each of (A) the case in which the combination of presence or absence of the process capabilities of the first control target device and the second control target device with respect to data received through the first communication path is the first combination, (B) the case in which the combination is the second combination, and (C) the case in which the combination is the third combination will be described.

In addition, hereinbelow, the process relating to the information processing method according to the present embodiment will be described mainly exemplifying a case in which at least one of the capability information of the first control target device and the capability information of the second control target device which are acquired through the first communication path includes the process capability information according to the present embodiment. As described above, when the process capability information according to the present embodiment is included in the capability information according to the present embodiment, the information processing device according to the present embodiment determines presence or absence of the process capability of the control target device that corresponds to the capability information with respect to data received through the first communication path based on the process capability information. In addition, when the process capability information according to the present embodiment is not included in the capability information according to the present embodiment, the information processing device according to the present embodiment assumes that the control target device that corresponds to the capability information does not have the process capability with respect to the data received through the first communication path.

Note that, as described above, the information processing device according to the present embodiment can also acquire the process capability information through communication that relates to the establishment of a session of the first communication path between at least one of the first control target device and the second control target device. An example of the process relating to the information processing method according to the embodiment when the process capability information is acquired in the communication that relates to the establishment of the session of the first communication path will be shown in (D) another example of the process relating to the information processing method according to the embodiment to be described later.

In addition, hereinbelow, the process relating to the information processing method according to the embodiment will be described exemplifying a case in which the information processing device according to the present embodiment is a portable-type communication device such as a smartphone. In addition, hereinbelow, the process relating to the information processing method according to the embodiment will be described exemplifying a case in which the first control target device which is a control target device of which communication is controlled by the information processing method according to the embodiment is a PC (Personal Computer) and the second control target device is a printer. Note that it is needless to say that the information processing device according to the present embodiment is not limited to a portable-type communication device and the control target device according to the present embodiment is not limited to a PC and a printer. Hereinbelow, there are cases in which the information processing device according to the present embodiment is denoted as an "information processing device 100," the first control target device according to the present embodiment as a "first control target device 200A," and the second control target device according to the present embodiment as a "second control target device 200B."

In addition, hereinbelow, description will be provided exemplifying a case in which the first communication path according to the present embodiment is a communication path formed based on NFC.

(A) Process Relating to the Information Processing Method According to the Present Embodiment in the First Combination (A-1) First Example of the Process Relating to the Information Processing Method According to the Present Embodiment FIG. 2 is an illustrative diagram for describing a first example of the process relating to the information processing method according to the embodiment, showing an example of a process performed in an information processing system according to the present embodiment which has the information processing device 100, the first control target device 200A, and the second control target device 200B. In addition, FIG. 2 shows an example of the process when the combination of presence or absence of the process capabilities of the first control target device and the second control target device with respect to data received through the first communication path is the first combination. To be specific, FIG. 2 shows an example in which the first control target device 200A does not have the function of processing data received through the first communication path and the second control target device 200B has the function of processing data received through the first communication path.

Herein, the information processing system shown in FIG. 2 is set such that the information processing device 100 has the function of an initiator in NFC (which is a so-called reader-writer function; the same applies hereinbelow) and the function of a target in NFC (which is a so-called card function; the same applies hereinbelow), and the second control target device 200B has the function of a target in NFC. In addition, the information processing system shown in FIG. 2 is set such that an NFC tag that stores capability information of the first control target device 200A is affixed to the first control target device 200A. In addition, the information processing system shown in FIG. 2 is set such that the first control target device 200A and the second control target device 200B each include communication interfaces that correspond to IEEE 802.15.1.

In addition, in FIG. 2, the process of Step S104 corresponds to the process (1) (decision process) described above and the process of Step S106 corresponds to the process (2) (transmission control process) described above.

The information processing device 100 performs communication with the NFC tag affixed to the first control target device 200A through the first communication path, thereby acquiring capability information A of the first control target device 200A (S100). The communication with the NFC tag affixed to the first control target device 200A through the first communication path is performed as, for example, the information processing device 100 plays the role as a reader-writer. In addition, as the capability information A, for example, data in the format shown in FIG. 1 is exemplified, however, the capability information A is not limited to the data of the format shown in FIG. 1.

The information processing device 100 performs communication with the second control target device 200B through the first communication path, thereby acquiring capability information B of the second control target device 200B (S102). The communication with the second control target device 200B through the first communication path is performed as, for example, the information processing device 100 plays the role as a reader-writer. In addition, as the capability information B, for example, data in the format shown in FIG. 1 is exemplified, however, the capability information B is not limited to the data of the format shown in FIG. 1.

When the capability information A of the first control target device 200A is acquired in Step S100 and the capability information B of the second control target device 200B is acquired in Step S102, the information processing device 100 decides a transmission target control target device based on the capability information A and the capability information B (S104). Here, in the example shown in FIG. 2, the first control target device 200A does not have the function of processing data received through the first communication path and the second control target device 200B has the function of processing data received through the first communication path. Thus, the information processing device 100 decides the second control target device 200B as the transmission target control target device in Step S104.

When the transmission target control target device is decided in Step S104, the information processing device 100 causes connection information A of the first control target device 200A (connection information of the other control target device) to be transmitted to the second control target device 200B as the transmission target control target device through the first communication path (S106). Here, when the connection information can be transmitted through the first communication path on which the capability information B has been acquired in Step S102, the information processing device 100 causes the connection information to be transmitted through the first communication path on which the capability information B has been acquired. As described above, by causing the connection information to be transmitted through the first communication path on which the capability information B has been acquired, the information processing device 100 can cause the connection information to be transmitted without causing a user to perform a touch operation with respect to the second control target device 200B again. Thus, as described above, when the connection information is transmitted through the first communication path on which the capability information B has been acquired, the information processing device 100 can improve convenience for the user.

Note that the process of Step S106 is not limited to the process of causing the connection information A to be transmitted through the first communication path on which the capability information B has been acquired. For example, the information processing device 100 may perform communication with the second control target device 200B through the first communication path again and cause the connection information A to be transmitted through the first communication path that has been formed again. When performing the communication with the second control target device 200B through the first communication path again, the information processing device 100 notifies the user of, for example, a start notification for starting the communication through the first communication path.

Here, in FIG. 2, since the second control target device 200B has the function of processing data received through the first communication path, the second control target device 200B can receive the connection information A transmitted in Step S106 and process the received connection information A. Thus, the second control target device 200B that has received the connection information A transmitted in Step S106 starts communication with the first control target device 200A through the second communication path using the received connection information A of the first control target device 200A (S108). In the example shown in FIG. 2, the second control target device 200B performs communication with the first control target device 200A using a communication interface that responds to IEEE 802.15.1.

When the first control target device 200A does not have the function of processing data received through the first communication path and the second control target device 200B has the function of processing data received through the first communication path, for example, the process shown in FIG. 2 is performed in the information processing system according to the present embodiment, and thereby communication between the first control target device 200A and the second control target device 200B is performed through the second communication path. Thus, by performing, for example, the process shown in FIG. 2, the information processing device 100 can control the communication between the control target devices.

(A-2) Second Example of the Process Relating to the Information Processing Method According to the Present Embodiment FIG. 3 is an illustrative diagram for describing a second example of the process relating to the information processing method according to the present embodiment, showing an example of a process performed in the information processing system according to the present embodiment which has the information processing device 100, the first control target device 200A, and the second control target device 200B. In addition, FIG. 3 shows an example of the process when the combination of presence or absence of the process capabilities of the first control target device and the second control target device with respect to data received through the first communication path is the first combination. To be specific, FIG. 3 shows an example in which the first control target device 200A has the function of processing data received through the first communication path and the second control target device 200B does not have the function of processing data received through the first communication path.

Herein, the information processing system shown in FIG. 3 is set such that the information processing device 100 has the function of an initiator in NFC and the function of a target in NFC, and the first control target device 200A has the function of a target in NFC. In addition, the information processing system shown in FIG. 3 is set such that an NFC tag that stores capability information of the second control target device 200B is affixed to the second control target device 200B. In addition, the information processing system shown in FIG. 3 is set such that the first control target device 200A and the second control target device 200B each include communication interfaces that correspond to IEEE 802.15.1.

In addition, in FIG. 3, the process of Step S204 corresponds to the process (1) (decision process) described above and the process of Step F206 corresponds to the process (2) (transmission control process) described above.

The information processing device 100 performs communication with the first control target device 200A through the first communication path, thereby acquiring the capability information A of the first control target device 200A (S200). The communication with the first control target device 200A through the first communication path is performed as, for example, the information processing device 100 plays the role of a reader-writer.

In addition, the information processing device 100 performs communication with the NFC tag affixed to the second control target device 200B through the first communication path, thereby acquiring the capability information B of the second control target device 200B (S202). The communication with the NFC tag affixed to the second control target device 200B through the first communication path is performed as, for example, the information processing device 100 plays the role of a reader-writer.

When the capability information A of the first control target device 200A is acquired in Step S200 and the capability information B of the second control target device 200B is acquired in Step S202, the information processing device 100 decides a transmission target control target device based on the capability information A and the capability information B (S204). Here, in the example shown in FIG. 3, the first control target device 200A has the function of processing data received through the first communication path and the second control target device 200B does not have the function of processing data received through the first communication path. Thus, the information processing device 100 decides the first control target device 200A as the transmission target control target device in Step S204.

When the transmission target control target device is decided in Step S104, the information processing device 100 causes the connection information B of the second control target device 200B (connection information of the other control target device) to be transmitted to the first control target device 200A that is the transmission target control target device through the first communication path (S206).

Here, when the connection information can be transmitted through the first communication path on which the capability information A has been acquired in Step S200, the information processing device 100 causes the connection information to be transmitted through the first communication path on which the capability information A has been acquired. However, when the first communication path is a communication path formed based on NFC, the communication through the first communication path on which the capability information A has been acquired is terminated in many cases in the stage in which the process of Step S202 is performed in consideration of the communicable distance. Thus, when the connection information can be transmitted through the first communication path on which the capability information A has been acquired in Step S200, the information processing device 100 performs communication with the first control target device 200A through the first communication path again and then causes the connection information B to be transmitted through the first communication path that has been formed again. When performing the communication with the first control target device 200A again through the first communication path, the information processing device 100 notifies the user of, for example, a start notification for starting the communication through the first communication path.

Here, in FIG. 3, since the first control target device 200A has the function of processing data received through the first communication path, the first control target device 200A can receive the connection information B transmitted in Step S206 and process the received connection information B. Thus, the first control target device 200A that has received the connection information B transmitted in Step S206 starts communication with the second control target device 200B through the second communication path using the received connection information B of the second control target device 200B (S208). In the example shown in FIG. 3, the first control target device 200A performs communication with the second control target device 200B using a communication interface that responds to IEEE 802.15.1.

When the first control target device 200A has the function of processing data received through the first communication path and the second control target device 200B does not have the function of processing data received through the first communication path, for example, the process shown in FIG. 3 is performed in the information processing system according to the present embodiment, and thereby communication between the first control target device 200A and the second control target device 200B is performed through the second communication path. Thus, by performing, for example, the process shown in FIG. 3, the information processing device 100 can control the communication between the control target devices.

When the combination of presence or absence of the process capabilities of the first control target device and the second control target device with respect to data received through the first communication path is the first combination, the information processing device according to the present embodiment performs, for example the process relating to the first example shown in FIG. 2 or the process relating to the second example shown in FIG. 3. Note that the process of the information processing device according to the present embodiment performed when the combination of presence or absence of the process capabilities of the first control target device and the second control target device with respect to data received through the first communication path is the first combination is not limited to the process relating to the first example or the process relating to the second example described above.

FIG. 4 is a sequence diagram showing an example of a process performed in the information processing system according to the present embodiment. FIG. 4 shows an example of the process performed in the information processing system according to the present embodiment when the combination of presence or absence of the process capabilities of the first control target device and the second control target device with respect to data received through the first communication path is the first combination. In addition, FIG. 4 shows an example of the process when the information processing system according to the present embodiment is configured as shown in FIG. 2. Note that, in FIG. 4, communication performed between the information processing device 100 and the NFC tag affixed to the first control target device 200A through the first communication path is expressed as communication performed between the information processing device 100 and the first control target device 200A through the first communication path.

The information processing device 100 and the NFC tag affixed to the first control target device 200A perform a connection process for performing communication through the first communication path (S300). Here, the connection process for performing the communication through the first communication path according to the present embodiment corresponds to a process relating to communication that relates to establishment of a session of the first communication path according to the present embodiment. As the connection process for performing the communication through the first communication path according to the present embodiment, for example, a process in which one device that plays the role of a reader-writer performs polling and the other device responds to the polling or the like is exemplified. By receiving a response to the polling, the one device that plays the role of a reader-writer recognizes that there is a device that can communicate through the first communication path. In Step S300, the information processing device 100 plays the role of a reader-writer.

When the process of Step S300 is performed, the information processing device 100 transmits a capability information transmission request including a transmission command for causing capability information to be transmitted through the first communication path (S302). Here, the information processing device 100 transmits the capability information transmission request by performing ASK (Amplitude Shift Keying).

The NFC tag affixed to the first control target device 200A that has received the capability information transmission request transmitted in Step S302 transmits the stored capability information A of the first control target device 200A through the first communication path in response to the capability information transmission request (S304). The NFC tag affixed to the first control target device 200A transmits the capability information A by, for example, performing load modulation.

The information processing device 100 that has received the capability information A transmitted from the NFC tag affixed to the first control target device 200A in Step S304 notifies a user of a start notification for starting communication with the second control target device 200B through the first communication path (S306). Here, the information processing device 100 notifies the user of the start notification by displaying, for example, a guide screen indicating that a touch operation is to be performed on the second control target device 200B on the display screen, causing an audio output device (which is provided in the device or outside) to output a guide sound indicating that a touch operation is to be performed on the second control target device 200B.

When the process of Step S306 is performed, the information processing device 100 and the second control target device 200B perform a connection process for performing communication through the first communication path (S308). In Step S308, the information processing device 100 plays the role of a reader-writer, and thus the information processing device 100 starts polling after, for example, the process of Step S306 is performed.

When the process of Step S308 is performed, the information processing device 100 transmits a capability information transmission request through the first communication path as in Step S302 (S310).

The second control target device 200B that has received the capability information transmission request transmitted in Step S310 transmits the stored capability information B of the second control target device 200B through the first communication path in response to the capability information transmission request as in Step S304 (S312).

Here, the second control target device 200B performing communication with the information processing device 100 through the first communication path may perform, for example, activation of a communication interface and reservation of a communication channel for forming the second communication path such as a communication interface that responds to IEEE 802.15.1. As described above, as the control target device according to the present embodiment performing communication with the information processing device 100 through the first communication path performs activation of a communication interface and reservation of a communication channel for forming the second communication path, communication between control devices through the second communication path can be performed more smoothly in the information processing system according to the present embodiment.

In addition, when the communication through the second communication path based on a set predetermined time and the reserved communication channel is not established in the case in which activation of a communication interface and reservation of a communication channel for forming the second communication path is performed, the second control target device 200B may perform, for example, cancellation of the communication channel and deactivation of the communication interface. Here, the predetermined time may be set in advance, or may be set (or reset) based on a user operation or the like. As described above, as the control target device according to the present embodiment performing communication with the information processing device 100 through the first communication path performs deactivation of the communication interface and cancellation of the communication channel for forming the second communication path, the control target device according to the present embodiment can achieve a reduction in power consumption and efficient use of communication resources.

In addition, when a new capability information transmission request is received in the case in which the activation of the communication interface and reservation of the communication channel for forming the second communication path are performed, the second control target device 200B may perform, for example, cancellation of the communication channel and deactivation of the communication interface. When the new capability information transmission request is received, the second control target device 200B transmits the capability information B of the second control target device 200B based on the capability information transmission request. As described above, as the control target device according to the present embodiment performing communication with the information processing device 100 through the first communication path performs deactivation of the communication interface and cancellation of the communication channel for forming the second communication path and transmission of the capability information B of the second control target device 200B based on the newly received capability information transmission request, an information processing system in which the control target devices perform smooth communication is realized.

The control target device according to the present embodiment performing communication with the information processing device 100 through the first communication path can perform, for example, the process described above (the same applies hereinafter).

The information processing device 100 that has received the capability information B from the second control target device 200B in Step S312 decides a transmission target control target device based on the capability information A received in Step S304 and the capability information B received in Step S312 (S314). Here, FIG. 4 shows an example of the process in the case of the configuration shown in FIG. 2, in which the first control target device 200A does not have the function of processing data received through the first communication path and the second control target device 200B has the function of processing data received through the first communication path. Thus, the information processing device 100 decides the second control target device 200B as the transmission target control target device in Step S314.

When the transmission target control target device is decided in Step S314, the information processing device 100 transmits the connection information A of the first control target device 200A to the second control target device 200B which is the transmission target control target device (S316). When the communication through the first communication path connected in Step S308 is possible, the information processing device 100 transmits the connection information A in the communication that is performed through the first communication path on which the capability information B has been received.

Note that the information processing device 100 may perform communication with the second control target device 200B again through the first communication path by performing, for example, the same process as Step S308 again to transmit the connection information A to the second control target device 200B through the first communication path that is formed again. In addition, when the communication is performed with the second control target device 200B again through the first communication path, the information processing device 100 notifies the user of, for example, a start notification for starting the communication through the first communication path as in Step S306.

The second control target device 200B transmits a response signal according to the reception result of the connection information A transmitted in Step S316 (S318).

The information processing device 100 that has received the response signal transmitted from the second control target device 200B in Step S318 gives a notification to the user based on the response signal (S320). As the notification based on the response signal, for example, a completion notification indicating that the transmission of the connection information A has been correctly performed (when the response signal indicates that the connection information A has been correctly received), or an error notification indicating that the transmission of the connection information A has not been correctly performed (when the response signal indicates that the connection information A has not been correctly received) is exemplified. By displaying, for example, the completion screen or the error screen on the display screen, the information processing device 100 gives the notification based on the response signal. In addition, when the response signal indicates that the connection information A has not been correctly received, the information processing device 100 may give a notification for guiding the user by displaying a guide screen on the display screen indicating that a touch operation should be performed again on the second control target device 200B, or outputting a guide sound indicating that the touch operation should be performed.

The second control target device 200B that has received the connection information A transmitted in Step S316 starts communication with the first control target device 200A through the second communication path using the connection information A of the first control target device 200A (S322).

By performing, for example, the process shown in FIG. 4 in the information processing system according to the present embodiment, the first control target device 200A and the second control target device 200B perform communication with each other through the second communication path. Here, in FIG. 4, the process of Step S314 corresponds to the process (1) (decision process) described above, and the process of Step S316 corresponds to the process (2) (transmission control process) described above. Thus, by performing, for example, the process shown in FIG. 4, the information processing device 100 can control communication between the control target devices.

Note that a process performed in the information processing system according to the present embodiment is not limited to the process shown in FIG. 4. FIG. 4 shows, for example, an example of the process in the case in which the information processing system according to the present embodiment has the configuration shown in FIG. 2, however, when the information processing system according to the present embodiment has the configuration shown in FIG. 3, the information processing device 100 decides the first control target device 200A as a transmission target control target device, and transmits the connection information B of the second control target device 200B to the first control target device 200A. In addition, in such a case, the first control target device 200A starts communication with the second control target device 200B through the second communication path using the connection information B of the second control target device 200B.

In addition, in the above description, the example in which the information processing device 100 performs the process relating to the information processing method according to the present embodiment in the information processing system according to the present embodiment has been shown, however, a configuration of the information processing system according to the present embodiment is not limited to the above. For example, in the information processing system according to the present embodiment, a control target device according to the present embodiment (the first control target device according to the present embodiment and/or the second control target device according to the present embodiment) can also perform the process relating to the information processing method according to the present embodiment. When the control target device according to the present embodiment performs the process relating to the information processing method according to the present embodiment, the control target device according to the present embodiment determines whether or not the information processing device has the function of performing the process relating to the information processing method according to the present embodiment in, for example, communication with the information processing device constituting the information processing system according to the present embodiment through the first communication path. Then, when the information processing device constituting the information processing system according to the present embodiment is not determined to have the function of performing the process relating to the information processing method according to the present embodiment, the control target device according to the present embodiment decides a direction in which connection information is moved, a communication scheme, the type of information, and the like in, for example, a specific format recorded in the information processing device constituting the information processing system according to the present embodiment.

(B) Process Relating to the Information Processing Method According to the Present Embodiment in the Second Combination Next, as another example of the process relating to the information processing method according to the present embodiment, an example of the process relating to the information processing method according to the present embodiment in the second combination will be described.

(B-1) Third Example of the Process Relating to the Information Processing Method According to the Present Embodiment FIG. 5 is an illustrative diagram for describing a third example of the process relating to the information processing method according to the present embodiment showing an example of a process performed in the information processing system according to the present embodiment which has the information processing device 100, the first control target device 200A, and the second control target device 200B. In addition, FIG. 5 shows an example of the process when the combination of presence or absence of the process capabilities of the first control target device and the second control target device with respect to data received through the first communication path is the second combination. To be specific, FIG. 5 shows an example in which the first control target device 200A has the function of processing data received through the first communication path and the second control target device 200B also has the function of processing data received through the first communication path.

Here, in the information processing system shown in FIG. 5, each of the information processing device 100, the first control target device 200A, and the second control target device 200B is assumed to have the function of an initiator in NFC and the function of a target in NFC, and further to respond to an inter-device communication protocol. In addition, in the information processing system shown in FIG. 5, the first control target device 200A and the second control target device 200B are assumed to have communication interfaces which respond to a plurality of communication schemes, for example, IEEE 802.15.1, IEEE 802.11b, and the like.

In addition, in FIG. 5, the process of Step S404 corresponds to the process (1) (decision process) described above and the process of Step S406 corresponds to the process (2) (transmission control process) described above.

The information processing device 100 performs communication with the first control target device 200A through the first communication path, thereby acquiring the capability information A of the first control target device 200A (S400). The communication with the first control target device 200A through the first communication path is performed as the information processing device 100 or the first control target device 200A plays the role of a reader-writer.

The information processing device 100 performs communication with the second control target device 200B through the first communication path, thereby acquiring capability information B of the second control target device 200B (S402). The communication with the second control target device 200B through the first communication path is performed as, for example, the information processing device 100 or the second control target device 200B plays the role as a reader-writer.

When the capability information A of the first control target device 200A is acquired in Step S400 and the capability information B of the second control target device 200B is acquired in Step S402, the information processing device 100 decides a transmission target control target device based on the capability information A and the capability information B (S404). Here, in the example shown in FIG. 5, both of the first control target device 200A and the second control target device 200B have the function of processing data received through the first communication path. In Step S404, the information processing device 100 decides the second control target device 200B between the first control target device 200A and the second control target device 200B as a transmission target control target device, which is a control target device that corresponds to the capability information that, for example, has been acquired later.

Note that the process of Step S404 is not limited to the process of deciding, as a transmission target control target device, a control target device between the first control target device 200A and the second control target device 200B, which corresponds to the capability information that has been acquired later. For example, the information processing device 100 may decide a transmission target control target device in Step S404 based on connection information included in the capability information of the first control target device 200A and connection information included in the capability information of the second control target device 200B. Hereinbelow, an example of the process relating to the information processing method according to the present embodiment will be described exemplifying the case in which the second control target device 200B is decided as a transmission target control target device in the process of Step S404 that corresponds to the process (1) (decision process) described above. Note that the case in which the first control target device 200A is decided as a transmission target control target device in the process (1) (decision process) described above in the second combination will be described later.

When the transmission target control target device is decided in Step S404, the information processing device 100 causes the connection information A of the first control target device 200A (connection information of the other control target device) to be transmitted to the second control target device 200B that is the transmission target control target device through the first communication path (S406) as in Step S106 shown in FIG. 2.

Here, in the example shown in FIG. 5, the first control target device 200A and the second control target device 200B have a plurality of communication interfaces that respond to communication schemes that can form the second communication path. The information processing device 100 compares, for example, communication schemes indicated by the connection information included in the capability information of the first control target device 200A and communication schemes indicated by the connection information included in the capability information of the second control target device 200B, and then decides the communication scheme that both of the control target devices respond to as the communication scheme for the second communication path. In addition, when there are a plurality of communication schemes that both of the control target devices respond to, the information processing device 100 decides a communication scheme having, for example, a higher priority as the communication scheme for the second communication path according to set priorities. Then, the information processing device 100 causes the connection information A that responds to the decided communication scheme to be transmitted through the first communication path.

In FIG. 2, since the second control target device 200B has the function of processing data received through the first communication path, the second control target device 200B can receive the connection information A transmitted in Step S406 and process the received connection information A. Thus, the second control target device 200B that has received the connection information A transmitted in Step S406 starts communication with the first control target device 200A through the second communication path using the received connection information A of the first control target device 200A (S408). In the example shown in FIG. 5, the second control target device 200B performs communication with the first control target device 200A using a communication interface that responds to a communication scheme indicated by the connection information A.

When both of the first control target device 200A and the second control target device 200B have the function of processing data received through the first communication path, for example, the process shown in FIG. 5 is performed in the information processing system according to the present embodiment, and thereby communication between the first control target device 200A and the second control target device 200B is performed through the second communication path. Thus, by performing, for example, the process shown in FIG. 5, the information processing device 100 can control the communication between the control target devices.

(B-2) Fourth Example of the Process Relating to the Information Processing Method According to the Present Embodiment FIG. 6 is an illustrative diagram for describing a fourth example of the process relating to the information processing method according to the present embodiment showing an example of a process performed in the information processing system according to the present embodiment which has the information processing device 100, the first control target device 200A, and the second control target device 200B. In addition, FIG. 6 shows another example of the process when the combination of presence or absence of the process capabilities of the first control target device and the second control target device with respect to data received through the first communication path is the second combination. To be specific, FIG. 6 shows an example in which the first control target device 200A has the function of processing data received through the first communication path and the second control target device 200B also has the function of processing data received through the first communication path.

Here, in the information processing system shown in FIG. 6, each of the information processing device 100, the first control target device 200A, and the second control target device 200B is assumed to have the function of an initiator in NFC and the function of a target in NFC, and further to respond to the inter-device communication protocol. In addition, in the information processing system shown in FIG. 6, the first control target device 200A is assumed to have, for example, a communication interface that responds to IEEE 802.15.1 and a communication interface that responds to IEEE 802.11b, and the second control target device 200B is assumed to have, for example, a communication interface that responds to IEEE 802.15.1.

In addition, in FIG. 6, the process of Step S504 corresponds to the process (1) (decision process) described above and the process of Step S506 corresponds to the process (2) (transmission control process) described above.

The information processing device 100 performs communication with the first control target device 200A through the first communication path, thereby acquiring the capability information A of the first control target device 200A (S500) as in Step S400 shown in FIG. 5.

In addition, the information processing device 100 performs communication with the second control target device 200B through the first communication path, thereby acquiring the capability information B of the second control target device 200B (S502) as in Step S402 shown in FIG. 5.

When the capability information A of the first control target device 200A is acquired in Step S500 and the capability information B of the second control target device 200B is acquired in Step S502, the information processing device 100 decides a transmission target control target device based on the capability information A and the capability information B (S504). Here, in the example shown in FIG. 6, both of the first control target device 200A and the second control target device 200B have the function of processing data received through the first communication path. The information processing device 100 decides the transmission target control target device based on, for example, connection information included in the capability information of the first control target device 200A and connection information included in the capability information of the second control target device 200B in Step S504.

Here, a specific example of a decision process of the transmission target control target device based on the capability information in Step S504 will be exemplified. With the capability information A of the first control target device 200A, the information processing device 100 can specify the fact that the first control target device 200A has the communication interface that responds to IEEE 802.15.1 and the communication interface that responds to IEEE 802.11b. In addition, with capability information B of the second control target device 200B, the information processing device 100 can specify the fact that the second control target device 200B has the communication interface that responds to IEEE 802.15.1.

In addition, the information processing device 100 can find an activation state of the communication interface that each of the control target devices has using, for example, the connection information (to be specific, for example, the status information shown in B1 of FIG. 1) included in each piece of the capability information. In the example of FIG. 6, both of the communication interface responding to IEEE 802.15.1 and the communication interface responding to IEEE 802.11b which are included in the first control target device 200A are set to be in a halt state, and the communication interface responding to IEEE 802.15.1 which is included in the second control target device 200B is set to be in the activated state.

By specifying the state using the acquired capability information A and capability information B, the information processing device 100 decides IEEE 802.15.1 that both of the first control target device 200A and the second control target device 200B respond to as the communication scheme for forming the second communication path. In addition, the information processing device 100 determines that it is necessary to cause the communication interface that responds to IEEE 802.15.1 included in the first control target device 200A to be in the activated state in order to cause the first control target device 200A and the second control target device 200B to communicate with each other through the second communication path formed with IEEE 802.15.1.

By performing the decision and the like as described above, the information processing device 100 decides the first control target device 200A as a transmission target control target device in Step S504.

When the transmission target control target device is decided in Step S504, the information processing device 100 causes the connection information B of the second control target device 200B (connection information of the other control target device) to be transmitted to the first control target device 200A that is the transmission target control target device through the first communication path (S506) as in Step S206 shown in FIG. 3.

In FIG. 6, since the first control target device 200A has the function of processing data received through the first communication path, the first control target device 200A can receive the connection information B transmitted in Step S506 and process the received connection information B. Thus, the first control target device 200A that has received the connection information B transmitted in Step S506 starts communication with the first control target device 200A through the second communication path using the received connection information B of the second control target device 200B (S508). In the example shown in FIG. 6, the second control target device 200B performs communication with the first control target device 200A using the communication interface that corresponds to IEEE 802.15.1.

When both of the first control target device 200A and the second control target device 200B have the function of processing data received through the first communication path, for example, the process shown in FIG. 6 is performed in the information processing system according to the present embodiment, and thereby communication between the first control target device 200A and the second control target device 200B is performed through the second communication path. Thus, by performing, for example, the process shown in FIG. 6, the information processing device 100 can control the communication between the control target devices.

When the combination of presence or absence of the process capabilities of the first control target device and the second control target device with respect to data received through the first communication path is the second combination, the information processing device according to the present embodiment performs, for example the process relating to the third example shown in FIG. 5 or the process relating to the fourth example shown in FIG. 6. Note that the process of the information processing device according to the present embodiment performed when the combination of presence or absence of the process capabilities of the first control target device and the second control target device with respect to data received through the first communication path is the second combination is not limited to the process relating to the third example or the process relating to the fourth example described above.

FIG. 7 is a sequence diagram showing an example of a process performed in the information processing system according to the present embodiment. FIG. 7 shows the example of the process performed in the information processing system according to the present embodiment when the combination of presence or absence of the process capabilities of the first control target device and the second control target device with respect to data received through the first communication path is the second combination. In addition, FIG. 7 shows the example of the process when the information processing system according to the present embodiment has the configuration shown in FIG. 6.

The information processing device 100 and the first control target device 200A perform a connection process for performing communication through the first communication path (S600). In Step S600, the information processing device 100 or the first control target device 200A plays the role of a reader-writer.

When the process of Step S600 is performed, the information processing device 100 transmits a capability information transmission request that includes a transmission command for causing capability information to be transmitted through the first communication path (S602) as in Step S302 shown in FIG. 4.

The first control target device 200A that has received the capability information transmission request transmitted in Step S602 transmits the stored capability information A of the first control target device 200A based on the capability information transmission request through the first communication path (S604) as in Step S304 shown in FIG. 4.

The information processing device 100 that has received the capability information A transmitted from the first control target device 200A in Step S604 notifies a user of a start notification for starting communication with the second control target device 200B through the first communication path (S606) as in Step S306 shown in FIG. 4.

When the process of Step S606 is performed, the information processing device 100 and the second control target device 200B perform a connection process for performing communication through the first communication path (S608) as in Step S308 shown in FIG. 4.

When the process of Step S608 is performed, the information processing device 100 transmits a capability information transmission request through the first communication path (S610) as in Step S310 shown in FIG. 4.

The second control target device 200B that has received the capability information transmission request transmitted in Step S610 transmits the stored capability information B of the second control target device 200B based on the capability information transmission request through the first communication path (S612) as in Step S312 shown in FIG. 4.

The information processing device 100 that has received the capability information B transmitted from the second control target device 200B in Step S612 decides a transmission target control target device based on the capability information A received in Step S604 and the capability information B received in Step S612 (S614).

Here, since FIG. 7 is the example of the process in the case of the configuration shown in FIG. 6, both of the first control target device 200A and the second control target device 200B have the function of processing data received through the first communication path. The information processing device 100 decides the transmission target control target device in Step S614 based on, for example, connection information included in the capability information of the first control target device 200A and connection information included in the capability information of the second control target device 200B.

Hereinbelow, an example of the process relating to the information processing method according to the present embodiment will be described exemplifying the case in which the first control target device 200A is decided as the transmission target control target device in the process of Step S614. Note that, when the second control target device 200B is decided as the transmission target control target device in the process of Step S614, the information processing device 100 performs, for example, the processes from Step S316 shown in FIG. 4, rather than the processes from Step S616 to be described below.

When the transmission target control target device is decided in Step S614, the information processing device 100 notifies the user of a start notification for starting communication with the first control target device 200A through the first communication path (S616). Here, the information processing device 100 notifies the user of the start notification by, for example, displaying a guide screen that guides a touch operation to be performed on the first control target device 200A on the display screen, outputting a guide sound that guides a touch operation to be performed on the first control target device 200A to an audio output device (provided in the device or outside), or the like.

In addition, the information processing device 100 and the first control target device 200A perform the connection process for performing communication through the first communication path (S618) as in Step S600.

When the process of Step S618 is performed, the information processing device 100 transmits the connection information B of the second control target device 200B to the first control target device 200A that is the transmission target control target device through the first communication path (S620).

The first control target device 200A transmits a response signal according to the reception result of the connection information B transmitted in Step S620 through the first communication path (S622).

The information processing device 100 that has received the response signal transmitted from the first control target device 200A in Step S622 gives a notification to the user based on the response signal (S624) as in Step S320 shown in FIG. 4.

The first control target device 200A that has received the connection information B transmitted in Step S620 starts communication with the second control target device 200B through the second communication path using the connection information B of the second control target device 200B (S626).

By performing, for example, the process shown in FIG. 7 in the information processing system according to the present embodiment, the first control target device 200A and the second control target device 200B perform communication with each other through the second communication path. Here, in FIG. 7, the process of Step S614 corresponds to the process (1) (decision process) described above, and the process of Step S620 corresponds to the process (2) (transmission control process) described above. Thus, by performing, for example, the process shown in FIG. 7, the information processing device 100 can control communication between the control target devices.

Note that a process performed in the information processing system according to the present embodiment is not limited to the process shown in FIG. 7. For example, the information processing device 100 may set a control target device between the first control target device 200A and the second control target device 200B which corresponds to the capability information that is acquired later to be a transmission target control target device in Step S614. When the transmission target control target device is decided as described above, the information processing device 100 decides the second control target device 200B that is a control target device that corresponds to the capability information that has been acquired later between the first control target device 200A and the second control target device 200B as the transmission target control target device.

In addition, in the above description, the example in which the information processing device 100 performs the process relating to the information processing method according to the present embodiment in the information processing system according to the present embodiment has been shown, however, a configuration of the information processing system according to the present embodiment is not limited thereto. For example, the control target device according to the present embodiment (the first control target device according to the present embodiment and/or the second control target device according to the present embodiment) can perform the process relating to the information processing method according to the present embodiment in the information processing system according to the present embodiment as described above.

(C) Process Relating to the Information Processing Method According to the Present Embodiment in the Third Combination Next, as another example of the process relating to the information processing method according to the present embodiment, an example of the process relating to the information processing method according to the present embodiment in the third combination will be described.

(C-1) Fifth Example of the Process Relating to the Information Processing Method According to the Present Embodiment FIG. 8 is an illustrative diagram for describing a fifth example of the process relating to the information processing method according to the present embodiment showing an example of a process performed in the information processing system according to the present embodiment which has the information processing device 100, the first control target device 200A, and the second control target device 200B. In addition, FIG. 8 shows an example of the process when the combination of presence or absence of the process capabilities of the first control target device and the second control target device with respect to data received through the first communication path is the third combination. To be specific, FIG. 8 shows an example in which the first control target device 200A does not have the function of processing data received through the first communication path and the second control target device 200B does not have the function of processing data received through the first communication path either.

Here, the information processing system shown in FIG. 8 is set such that the information processing device 100 has the function of an initiator in NFC and the function of a target in NFC. In addition, the information processing system shown in FIG. 8 is set such that an NFC tag that stores the capability information of the first control target device 200A is affixed to the first control target device 200A, and another NFC tag that stores the capability information of the second control target device 200B is affixed to the second control target device 200B. Furthermore, the information processing system shown in FIG. 8 is set such that the first control target device 200A and the second control target device 200B each have the communication interfaces that respond to IEEE 802.15.1.

In addition, in FIG. 8, the process of Step S704 corresponds to the process (1) (decision process) described above and the process of Step S708 corresponds to the process (2) (transmission control process) described above.

The information processing device 100 performs communication with the NFC tag affixed to the first control target device 200A through the first communication path, thereby acquiring the capability information of the first control target device 200A (S700) as in Step S100 shown in FIG. 2.

In addition, the information processing device 100 performs communication with the NFC tag affixed to the second control target device 200B through the first communication path, thereby acquiring the capability information B of the second control target device 200B (S702). The communication with the NFC tag affixed to the second control target device 200B through the first communication path is performed as, for example, the information processing device 100 plays the role of a reader-writer.

When the capability information A of the first control target device 200A is acquired in Step S700 and the capability information B of the second control target device 200B is acquired in Step S702, the information processing device 100 decides a transmission target control target device based on the capability information A and the capability information B (S704). Here, in the example shown in FIG. 8, neither the first control target device 200A nor the second control target device 200B has the function of processing data received through the first communication path. Thus, the information processing device 100 decides the transmission target control target device based on, for example, an order of acquiring the capability information, set priorities, or a user operation in Step S704.

Hereinbelow, an example of the process relating to the information processing method according to the present embodiment will be described exemplifying the case in which the second control target device 200B is decided as the transmission target control target device in the process of Step S704 that corresponds to the process (1) (decision process) described above. Note that an example of the case in which the first control target device 200A is decided as the transmission target control target device in the process (1) (decision process) described above in the third combination will be described later.

When the transmission target control target device is decided in Step S704, the information processing device 100 starts communication with the second control target device 200B that is the transmission target control target device through the third communication path (S706). Here, the information processing device according to the present embodiment performs the communication with the second control target device 200B using connection information included in the capability information of the second control target device 200B that has been acquired in Step S702. In the example shown in FIG. 8, the second control target device 200B has the communication interface that responds to IEEE 802.15.1. Thus, the information processing device 100 decides IEEE 802.15.1 indicated by the connection information included in the capability information of the second control target device 200B as the communication scheme for forming the third communication path, and then starts the communication based on IEEE 802.15.1 with the second control target device 200B using the connection information.

Note that there may be cases in which the information processing device 100 and the second control target device 200B (an example of the transmission target control target device) have difficulty performing communication, for example, when the information processing device 100 does not have the communication interface that responds to IEEE 802.15.1 (an example of a communication interface that enables communication with a transmission target control target device). In such a case, the information processing device 100 notifies a user of an error, for example, indicating that the first control target device 200A and the second control target device 200B have difficulty performing communication.

When the communication with the second control target device 200B that is the transmission target control target device is started through the third communication path in Step S706, the information processing device 100 causes the connection information A of the first control target device 200A (connection information of the other control target device) to be transmitted to the second control target device 200B that is the transmission target control target device through the third communication path (S708).

Here, in FIG. 8, since the second control target device 200B has the function of processing data received through the third communication path, the second control target device 200B can receive the connection information A transmitted in Step S708 and process the received connection information A. Thus, the second control target device 200B that has received the connection information A transmitted in Step S708 starts communication with the first control target device 200A through the second communication path using the received connection information A of the first control target device 200A (S710). In the example shown in FIG. 8, the second control target device 200B performs communication with the first control target device 200A using a communication interface that responds to IEEE 802.15.1.

When neither the first control target device 200A nor the second control target device 200B does not have the function of processing data received through the first communication path, for example, the process shown in FIG. 8 is performed in the information processing system according to the present embodiment, and thereby communication between the first control target device 200A and the second control target device 200B is performed through the second communication path. Thus, by performing, for example, the process shown in FIG. 8, the information processing device 100 can control the communication between the control target devices.

(C-2) Sixth Example of the Process Relating to the Information Processing Method According to the Present Embodiment FIG. 9 is an illustrative diagram for describing a second example of the process relating to the information processing method according to the present embodiment, showing an example of a process performed in the information processing system according to the present embodiment which has the information processing device 100, the first control target device 200A, and the second control target device 200B. In addition, FIG. 9 shows an example of the process when the combination of presence or absence of the process capabilities of the first control target device and the second control target device with respect to data received through the first communication path is the third combination. To be specific, FIG. 9 shows an example in which the first control target device 200A does not have the function of processing data received through the first communication path and the second control target device 200B does not have the function of processing data received through the first communication path either.

Here, the information processing system shown in FIG. 9 is set such that the information processing device 100 has the function of an initiator in NFC and the function of a target in NFC. In addition, the information processing system shown in FIG. 9 is set such that an NFC tag that stores the capability information of the first control target device 200A is affixed to the first control target device 200A, and another NFC tag that stores the capability information of the second control target device 200B is affixed to the second control target device 200B. Furthermore, the information processing system shown in FIG. 9 is set such that the first control target device 200A and the second control target device 200B each have the communication interfaces that respond to IEEE 802.15.1.

In addition, in FIG. 9, the process of Step S804 corresponds to the process (1) (decision process) described above and the process of Step S808 corresponds to the process (2) (transmission control process) described above.

The information processing device 100 performs communication with the NFC tag affixed to the first control target device 200A through the first communication path, thereby acquiring the capability information of the first control target device 200A (S800) as in Step S100 shown in FIG. 2.

In addition, the information processing device 100 performs communication with the NFC tag affixed to the second control target device 200B through the first communication path, thereby acquiring the capability information B of the second control target device 200B (S802) as in Step S702 shown in FIG. 8.

When the capability information A of the first control target device 200A is acquired in Step S800 and the capability information B of the second control target device 200B is acquired in Step S802, the information processing device 100 decides a transmission target control target device based on the capability information A and the capability information B (S804) as in Step S704 shown in FIG. 8. Hereinbelow, an example of the process relating to the information processing method according to the present embodiment will be described exemplifying the case in which the first control target device 200A is decided as the transmission target control target device in the process of Step S804 that corresponds to the process (1) (decision process) described above.

When the transmission target control target device is decided in Step S804, the information processing device 100 starts communication with the first control target device 200A that is the transmission target control target device through the third communication path (S806) as in Step S706 shown in FIG. 8.

When the communication with the first control target device 200A that is the transmission target control target device is started through the third communication path in Step S806, the information processing device 100 causes the connection information B of the second control target device 200B (connection information of the other control target device) to be transmitted to the first control target device 200A that is the transmission target control target device through the third communication path (S808).

Here, in FIG. 9, since the first control target device 200A has the function of processing data received through the third communication path, the first control target device 200A can receive the connection information B transmitted in Step S808 and process the received connection information B. Thus, the first control target device 200A that has received the connection information B transmitted in Step S808 starts communication with the first control target device 200A through the second communication path using the received connection information B of the second control target device 200B (S810). In the example shown in FIG. 9, the second control target device 200B performs communication with the first control target device 200A using the communication interface that corresponds to IEEE 802.15.1.

When neither the first control target device 200A nor the second control target device 200B does not have the function of processing data received through the first communication path, for example, the process shown in FIG. 9 is performed in the information processing system according to the present embodiment, and thereby communication between the first control target device 200A and the second control target device 200B is performed through the second communication path. Thus, by performing, for example, the process shown in FIG. 9, the information processing device 100 can control the communication between the control target devices.

When the combination of presence or absence of the process capabilities of the first control target device and the second control target device with respect to data received through the first communication path is the third combination, the information processing device according to the present embodiment performs, for example the process relating to the fifth example shown in FIG. 8 or the process relating to the sixth example shown in FIG. 9. Note that the process of the information processing device according to the present embodiment performed when the combination of presence or absence of the process capabilities of the first control target device and the second control target device with respect to data received through the first communication path is the third combination is not limited to the process relating to the fifth example or the process relating to the sixth example described above.

FIG. 10 is a sequence diagram showing an example of the process performed in the information processing system according to the present embodiment. FIG. 10 shows the example of the process performed in the information processing system according to the present embodiment when the combination of presence or absence of the process capabilities of the first control target device and the second control target device with respect to data received through the first communication path is the third combination. In addition, FIG. 10 shows the example of the process when the information processing system has the configuration shown in FIG. 9.

Note that, in FIG. 10, the communication performed between the information processing device 100 and the NFC tag affixed to the first control target device 200A through the first communication path is expressed as communication between the information processing device 100 and the first control target device 200A through the first communication path for the sake of convenience of description. In addition, in FIG. 10, the communication performed between the information processing device 100 and the NFC tag affixed to the second control target device 200B through the first communication path is expressed as communication between the information processing device 100 and the second control target device 200B through the first communication path for the sake of convenience of description.

The information processing device 100 and the NFC tag affixed to the first control target device 200A perform a connection process for performing communication through the first communication path (S900) as in Step S300 shown in FIG. 4.

When the process of Step S900 is performed, the information processing device 100 transmits a capability information transmission request that includes a transmission command for causing capability information to be transmitted through the first communication path (S902) as in Step S302 shown in FIG. 4.

The NFC tag affixed to the first control target device 200A that has received the capability information transmission request transmitted in Step S902 transmits the stored capability information A of the first control target device 200A based on the capability information transmission request through the first communication path (S904) as in Step S304 shown in FIG. 4.

The information processing device 100 that has received the capability information A transmitted from the first control target device 200A in Step S904 notifies a user of a start notification for starting communication with the second control target device 200B through the first communication path (S906) as in Step S306 shown in FIG. 4.

When the process of Step S906 is performed, the information processing device 100 and the NFC tag affixed to the second control target device 200B perform a connection process for performing communication through the first communication path (S908). In Step S908, the information processing device 100 plays the role of a reader-writer.

When the process of Step S908 is performed, the information processing device 100 transmits a capability information transmission request through the first communication path (S910) as in Step S310 shown in FIG. 4.

The NFC tag affixed to the second control target device 200B that has received the capability information transmission request transmitted in Step S910 transmits the stored capability information B of the second control target device 200B based on the capability information transmission request through the first communication path (S912) as in Step S312 shown in FIG. 4.

The NFC tag affixed to the information processing device 100 that has received the capability information B transmitted from the second control target device 200B in Step S912 decides a transmission target control target device based on the capability information A received in Step S904 and the capability information B received in Step S912 (S914).

Here, since FIG. 10 is an example of the process in the case of the configuration shown in FIG. 9, neither the first control target device 200A nor the second control target device 200B has the function of processing data received through the first communication path. The information processing device 100 decides a transmission target control target device based on, for example, an order of acquiring the capability information, set priorities, or a user operation in Step S914.

Hereinbelow, an example of the process relating to the information processing method according to the present embodiment will be described exemplifying the case in which the first control target device 200A is decided as the transmission target control target device in the process of Step S914. Note that, when the second control target device 200B is decided as the transmission target control target device in the process of Step S914, the information processing device 100 performs, for example, the processes from Step S316 shown in FIG. 4, rather than the processes from Step S916 to be described below.

When the transmission target control target device is decided in Step S914, the information processing device 100 starts communication with the first control target device 200A through the third communication path (S916). The information processing device 100 performs the communication with the first control target device 200A through the third communication path based on, for example, connection information included in the capability information A of the first control target device 200A acquired in Step S904. Note that, when the transmission target control target device is decided in Step S914, the information processing device 100 may notify the user of the decided transmission target control target device.

When the process of Step S916 is performed, the information processing device 100 transmits the connection information B of the second control target device 200B to the first control target device 200A that is the transmission target control target device through the third communication path (S918).

The first control target device 200A transmits a response signal according to the reception result of the connection information B transmitted in Step S918 through the third communication path (S920).

The information processing device 100 that has received the response signal transmitted from the first control target device 200A in Step S920 gives a notification to the user based on the response signal (S922) as in Step S320 shown in FIG. 4.

The first control target device 200A that has received the connection information B transmitted in Step S918 starts communication with the second control target device 200B through the second communication path using the connection information B of the second control target device 200B (S924).

By performing, for example, the process shown in FIG. 10 in the information processing system according to the present embodiment, the first control target device 200A and the second control target device 200B perform communication with each other through the second communication path. Here, in FIG. 10, the process of Step S914 corresponds to the process (1) (decision process) described above, and the process of Step S918 corresponds to the process (2) (transmission control process) described above. Thus, by performing, for example, the process shown in FIG. 10, the information processing device 100 can control communication between the control target devices.

Note that it is needless to say that a process performed in the information processing system according to the present embodiment is not limited to the process shown in FIG. 10.

(D) Another Example of the Process Relating to the Information Processing Method According to the Present Embodiment In (A) to (C) described above, the examples of "the process relating to the information processing method according to the present embodiment when the process capability information according to the present embodiment is included in at least one of the capability information of the first control target device and the capability information of the second control target device which are acquired through the first communication path" have been shown as examples of the process relating to the information processing method according to the present embodiment. The information processing device according to the present embodiment, however, can acquire the process capability information in communication to be performed with at least one of the first control target device and the second control target device, which relates to the establishment of a session of the first communication path as described above. Thus, next, as another example of the process relating to the information processing method according to the present embodiment, an example of the process relating to the information processing method according to the present embodiment when the information processing device according to the present embodiment acquires the process capability information in the communication which relates to the establishment of a session of the first communication path will be described.

FIG. 11 is a sequence diagram showing an example of the process performed in the information processing system according to the present embodiment. FIG. 11 shows the example of the process performed in the information processing system according to the present embodiment when the combination of presence or absence of the process capabilities of the first control target device and the second control target device with respect to data received through the first communication path is the first combination. In addition, FIG. 11 shows the example of the process when the information processing system has the configuration shown in FIG. 2. Here, Steps S1000 to S1008 and S1016 to S1024 shown in FIG. 11 correspond to the process relating to communication for the establishment of a session of the first communication path according to the present embodiment.

The information processing device 100 transmits a polling signal (S1000). Here, the information processing device 100 may transmit the polling signal, for example, regularly or irregularly, or may transmit the polling signal when a user operation that indicates a start of a polling is detected or when a sensor such as an infrared ray sensor detects an external device.

The first control target device 200A that has received the polling signal transmitted from the information processing device 100 in Step S1000 transmits a polling response signal (S1002).

The information processing device 100 that has received the polling response signal transmitted from the first control target device 200A in Step S1002 transmits an attribute request that requests transmission of attribute information (S1004).

Here, as attribute information according to the present embodiment, for example, information (data) that indicates a communication speed supported by the device itself or the like is exemplified. In addition, the process capability information according to the present embodiment may be information included in the attribute information according to the present embodiment.

The attribute request according to the present embodiment includes, for example, a process capability information transmission request that requests transmission of the process capability information according to the present embodiment. In addition, when the process capability information according to the present embodiment is the information included in the attribute information according to the present embodiment, the attribute request according to the present embodiment may play the role of, for example, the process capability information transmission request that requests the transmission of the process capability information according to the present embodiment. Note that the information processing device 100 can also transmit, for example, the attribute request according to the present embodiment and the process capability information transmission request according to the present embodiment in communication through the first communication path of a different transaction.

The first control target device 200A that has received the attribute request transmitted from the information processing device 100 in Step S1004 transmits the attribute information and the process capability information (S1006).

When the processes of Steps S1000 to S1006 are performed between the information processing device 100 and the first control target device 200A, the information processing device 100 and the first control target device 200A perform a session establishment process (S1008). As the process of Step S1008 is performed, the first communication path between the information processing device 100 and the first control target device 200A is the first communication path of which a session has been established. Here, as the session establishment process according to the present embodiment, for example, a process defined in "5.6 Connection-oriented Transport Mode Procedures" of NFC Logical Link Control Protocol (LLCP) Technical Specification Version 1.1 is exemplified.

When the process of Step S1008 is performed, the information processing device 100 transmits a capability information transmission request that includes a transmission command for causing capability information to be transmitted through the first communication path (S1010) as in Step S302 shown in FIG. 4.

The first control target device 200A that has received the capability information transmission request transmitted in Step S1010 transmits the stored capability information A of the first control target device 200A based on the capability information transmission request through the first communication path (S1012) as in Step S304 shown in FIG. 4.

The information processing device 100 that has received the capability information A transmitted from the first control target device 200A in Step S1012 notifies a user of a start notification for starting communication with the second control target device 200B through the first communication path (S1014) as in Step S306 shown in FIG. 4.

When the process of Step S1014 is performed, the information processing device 100 transmits a polling signal (S1016) as in Step S1000.

The second control target device 200B that has received the polling signal transmitted from the information processing device 100 in Step S1016 transmits a polling response signal (S1018) as in Step S1002.

The information processing device 100 that has received the polling response signal transmitted from the second control target device 200B in Step S1018 transmits an attribute request that requests transmission of attribute information (S1020) as in Step S1004.

The second control target device 200B that has received the attribute request transmitted from the information processing device 100 in Step S1020 transmits the attribute information and the process capability information (S1022) as in Step S1006.

When the processes of Steps S1016 to S1022 are performed between the information processing device 100 and the second control target device 200B, the information processing device 100 and the second control target device 200B perform a session establishment process (S1024) as in Step S1008. As the process of Step S1024 is performed, the first communication path between the information processing device 100 and the second control target device 200B is the first communication path of which a session has been established.

When the process of Step S1024 is performed, the information processing device 100 transmits a capability information transmission request through the first communication path (S1016) as in Step S302 shown in FIG. 4.

The second control target device 200B that has received the capability information transmission request transmitted in Step S1016 transmits the stored capability information B of the second control target device 200B based on the capability information transmission request through the first communication path (S1018) as in Step S304 shown in FIG. 4.

The information processing device 100 that has received the capability information B transmitted from the second control target device 200B in Step S1018 decides a transmission target control target device based on the process capability information of the first control target device 200A received in Step S1006 and the process capability information of the second control target device 200B received in Step S1022 (S1030). Here, since FIG. 11 is an example of the process in the case of the configuration shown in FIG. 2, the first control target device 200A does not have the function of processing data received through the first communication path, and the second control target device 200B has the function of processing data received through the first communication path. Thus, the information processing device 100 decides the second control target device 200B as the transmission target control target device in Step S1030.

When the transmission target control target device is decided in Step S1030, the information processing device 100 transmits the connection information A of the first control target device 200A to the second control target device 200B that is the transmission target control target device (S1032) as in Step S316 shown in FIG. 4.

The second control target device 200B transmits a response signal according to the reception result of the connection information A transmitted in Step S1032 (S1034) as in Step S318 shown in FIG. 4.

The information processing device 100 that has received the response signal transmitted from the second control target device 200B in Step S1034 gives a notification to the user based on the response signal (S1036) as in Step S320 shown in FIG. 4.

The second control target device 200B that has received the connection information A transmitted in Step S1036 starts communication with the first control target device 200A through the second communication path using the received connection information A of the first control target device 200A (S1 Here, in FIG. 2, since the second control target device 200B has the function of processing data received through the first communication path, the second control target device 200B can receive the connection information A transmitted in Step S106 and process the received connection information A. Thus, the second control target device 200B that has received the connection information A transmitted in Step S106 starts communication with the first control target device 200A through the second communication path using the received connection information A of the first control target device 200A (S108). In the example shown in FIG. 2, the second control target device 200B performs communication with the first control target device 200A using a communication interface that responds to IEEE 802.15.1. 038) as in Step S322 shown in FIG. 4.

By performing, for example, the process shown in FIG. 11 in the information processing system according to the present embodiment, the first control target device 200A and the second control target device 200B perform communication with each other through the second communication path. Here, in FIG. 11, the process of Step S1030 corresponds to the process (1) (decision process) described above, and the process of Step S1032 corresponds to the process (2) (transmission control process) described above. Thus, by performing, for example, the process shown in FIG. 11, the information processing device 100 can control communication between the control target devices.

Note that a "process performed in the information processing system according to the present embodiment when the information processing device according to the present embodiment acquires the process capability information in the communication that relates to the establishment of a session of the first communication path" is not limited to application to the process performed when the combination of presence or absence of the process capabilities of the first control target device and the second control target device with respect to data received through the first communication path is the first combination as shown in FIG. 11.

For example, the "process performed in the information processing system according to the present embodiment when the information processing device according to the present embodiment acquires the process capability information in the communication that relates to the establishment of a session of the first communication path" can be applied to the process performed when the combination of presence or absence of the process capabilities of the first control target device and the second control target device with respect to data received through the first communication path is the second combination as shown in FIG. 7, since the same processes as those of Steps S1000 to S1008 shown in FIG. 11 are performed in the connection processes (Steps S600 and S608 of FIG. 7) shown in FIG. 7. In addition, the "process performed in the information processing system according to the present embodiment when the information processing device according to the present embodiment acquires the process capability information in the communication that relates to the establishment of a session of the first communication path" can also be applied to, for example, the process performed when the combination of presence or absence of the process capabilities of the first control target device and the second control target device with respect to data received through the first communication path is the third combination as shown in FIG. 10, since the same processes as those of Steps S1000 to S1008 shown in FIG. 11 are performed in the connection processes (Steps S900 and S908 of FIG. 10) shown in FIG. 10. Here, when the "process performed in the information processing system according to the present embodiment when the information processing device according to the present embodiment acquires the process capability information in the communication that relates to the establishment of a session of the first communication path" is applied to the process in the case of the second combination or the process in the case of the third combination, the capability information acquired by the information processing device 100 from each of the control target devices in FIGS. 7 and 10 is, for example, information that includes the connection information and does not include the process capability information.

(Information Processing Device According to the Present Embodiment)

Next, an example of a configuration of the information processing device according to the present embodiment which can perform the process relating to the information processing method according to the present embodiment described above will be described. FIG. 12 is a block diagram showing the example of the configuration of the information processing device 100 according to the present embodiment. Here, FIG. 12 also shows the first control target device 200A according to the present embodiment and the second control target device 200B together.

The information processing device 100 has a first communication unit 102, a second communication unit 104, and a control unit 106.

In addition, the information processing device 100 may also have, for example, a ROM (Read Only Memory; not illustrated), a RAM (Random Access Memory; not illustrated), a storage unit (not illustrated), an operation unit that a user can operate (not illustrated), a display unit that causes various kinds of screens to be displayed on the display screen (not illustrated), and the like. The information processing device 100 causes the constituent elements described above to be connected to each other using, for example, a bus serving as a transmission path of data.

Here, the ROM (not illustrated) stores data for control such as programs, and arithmetic operation parameters that the control unit 106 uses. The RAM (not illustrated) temporarily stores programs and the like executed by the control unit 106.

The storage unit (not illustrated) is a storage section that the information processing device 100 has, which stores various types of data, for example, data constituting a UI (User Interface), applications, and the like. Here, as the storage unit (not illustrated), for example, a magnetic recording medium such as a hard disk, a non-volatile memory such as an EEPROM (Electrically Erasable and Programmable Read Only Memory) or a flash memory, and the like are exemplified. In addition, the storage unit (not illustrated) may be attached to or detached from the information processing device 100.

In addition, as the operation unit (not illustrated), an operation input device to be described later is exemplified, and as the display unit (not illustrated), a display device to be described later is exemplified.

[Hardware Configuration Example of the Information Processing Device 100]

Figure 13:
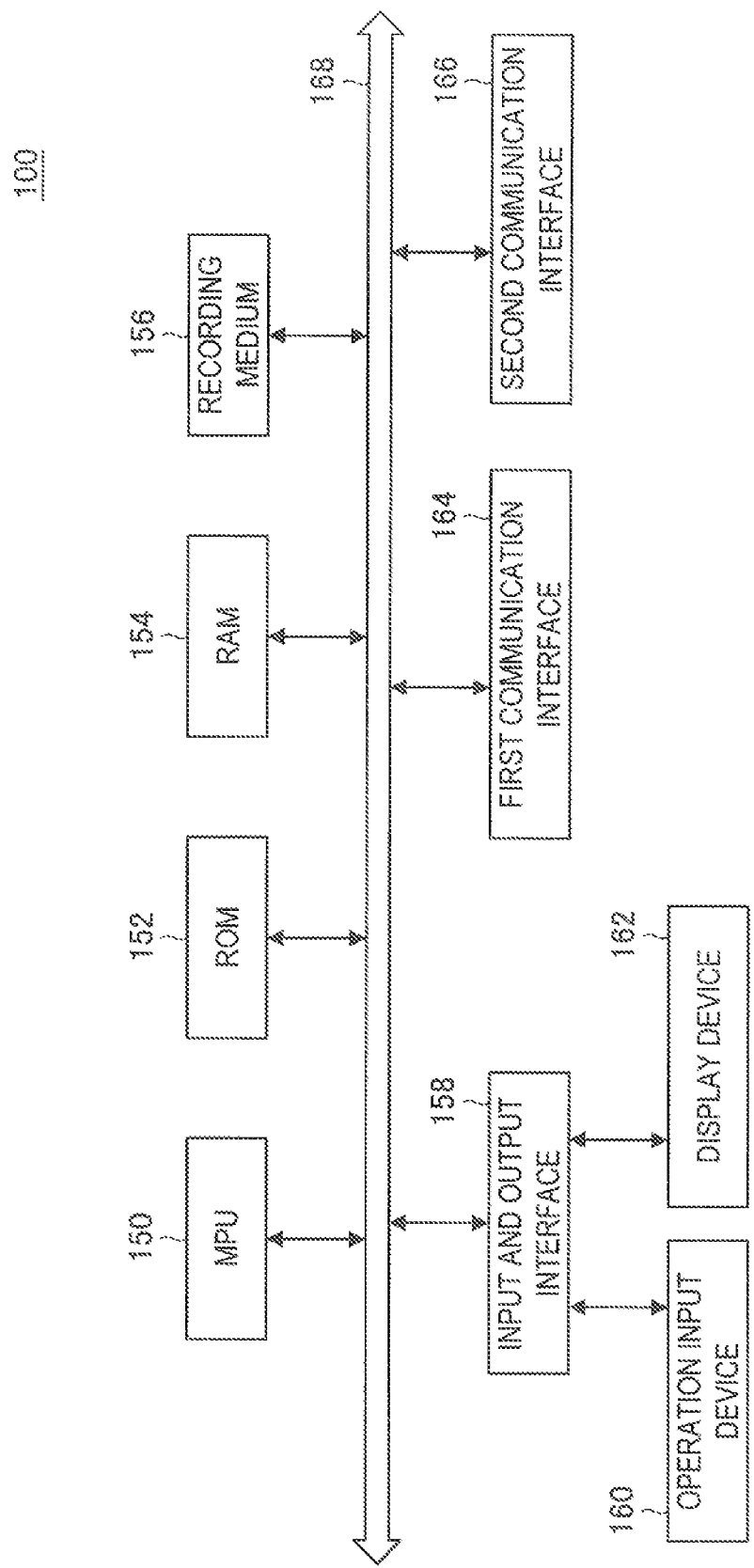
FIG. 13 is an illustrative diagram showing an example of a hardware configuration of an information processing device according to the embodiment.

FIG. 13 is an illustrative diagram showing an example of a hardware configuration of the information processing device 100 according to the present embodiment. The information processing device 100 has, for example, an MPU 150, a ROM 152, a RAM 154, a recording medium 156, an input and output interface 158, an operation input device 160, a display device 162, a first communication interface 164, and a first communication interface 166. In addition, the information processing device 100 causes the constituent elements to be connected to each other using, for example, a bus 168 serving as a transmission path of data.

The MPU 150 is constituted by, for example, an MPU (Micro Processing Unit), various kinds of processing circuits, and the like functioning as the control unit 106 that controls the entire information processing device 100. In addition, the MPU 150 plays, for example, the role of a decision unit 110 and a transmission control unit 112 to be described later in the information processing device 100.

The ROM 152 stores data for control such as programs, arithmetic operation parameters, and the like that the MPU 150 uses. The RAM 154 temporarily stores, for example, programs executed by the MPU 150 and the like.

The recording medium 156 functions as a storage unit (not illustrated), and stores various kinds of data, for example, data constituting a UI, applications, and the like. Here, as the recording medium 156, for example, a magnetic recording medium such as a hard disk, or a non-volatile memory such as a flash memory is exemplified. In addition, the recording medium 156 may be attached to or detached from the information processing device 100.

The input and output interface 158 is connected to, for example, the operation input device 160 and the display device 162. The operation input device 160 functions as an operation unit (not illustrated), and the display device 162 functions as a display unit (not illustrated). Here, as the input and output interface 158, for example, a USB (Universal Serial Bus) terminal, a DVI (Digital Visual Interface) terminal, an HDMI (High-Definition Multimedia Interface) terminal, various processing circuits, and the like are exemplified. In addition, the operation input device 160 is provided, for example, on the information processing device 100 and connected to the input and output interface 158 in the inside of the information processing device 100. As the operation input device 160, for example, buttons, arrow keys, a rotation type selector such as a jog dial or a combination thereof, and the like are exemplified. In addition, the display device 162 is provided, for example, on the information processing device 100 and connected to the input and output interface 158 in the inside of the information processing device 100. As the display device 162, for example, a liquid crystal display, an organic EL display (Organic Electro-Luminescence display; also called an OLED display (Organic Light Emitting Diode display)), and the like is exemplified.

Note that it is needless to say that the input and output interface 158 can be connected to an external device such as an operation input device serving as an external device of the information processing device 100 (for example, a keyboard, a mouse, or the like), a display device, or various communication devices having the function of performing communication through the first communication path or a third communication path. In addition, the display device 162 may be a device that can perform display and a user operation, for example, a touch screen, or the like.

The first communication interface 164 is a first communication means that the information processing device 100 has, functioning as the first communication unit 102 that performs communication with an external device such as the first control target device 200A or the second control target device 200B through the first communication path. Here, as the first communication interface 164, for example, an NFC interface that has a wireless communication antenna circuit and a carrier wave transmission circuit is exemplified.

The wireless communication antenna circuit constituting the first communication interface 164 plays the role of forming the first communication path between an external device. The wireless communication antenna circuit is constituted by a resonance circuit and a demodulating circuit that include a coil having a predetermined inductance and a capacitor having a predetermined electrostatic capacity as transmission and reception antennas. In addition, the wireless communication antenna circuit demodulates, for example, data transmitted from an external device or the like by receiving an electric field (carrier wave) of 13.56 MHz.

In addition, the carrier wave transmission circuit constituting the first communication interface 164 includes, for example, a modulating circuit that performs modulation of ASK or the like and an amplifying circuit that amplifies outputs of the modulating circuit, and transmits carrier waves which carry carrier wave signals from the transmission-reception antenna of the wireless communication antenna circuit. By including the carrier wave transmission circuit, the information processing device 100 can have the function of an initiator in NFC and can play the role of a so-called reader-writer. Here, as the carrier wave signals that the carrier wave transmission circuit transmits from the wireless communication antenna circuit and transmits, for example, signals indicating a capability information transmission request, connection information, and the like are exemplified. In addition, the transmission of the carrier waves of the carrier wave transmission circuit is controlled by, for example, the MPU 150.

The first communication interface 164 functions as the first communication unit 102 that forms the first communication path by having an NFC interface constituted by, for example, such a wireless communication antenna circuit and the carrier wave transmission circuit described above. Note that the first communication interface 164 is not limited to the NFC interface. For example, when the first communication path is formed through infrared ray communication, the information processing device 100 has an infrared ray communication interface constituted by an infrared ray port, a transmission-reception circuit, and the like as the first communication interface 164.

The second communication interface 166 is a second communication means that the information processing device 100 has, functioning as a second communication unit 104 that performs communication with an external device such as a first control target device 200A, a second control target device 200B, or a server through the third communication path. Here, as the second communication interface 164, for example, an IEEE 802.15.1 port and a transmission-reception circuit, an IEEE 802.11b port and a transmission-reception circuit, and the like are exemplified.

The information processing device 100 performs the process relating to the information processing method according to the present embodiment with, for example, the configuration shown in FIG. 13. Note that a hardware configuration of the information processing device 100 according to the present embodiment is not limited to the configuration shown in FIG. 13. In the case of a configuration in which communication through the first communication path or communication through the third communication path is performed with a connected external communication device, for example, the information processing device 100 may not have the first communication interface 164 and/or the second communication interface 166.

In addition, the information processing device 100 may further have, for example, a DSP (Digital Signal Processor) and an audio output device. As the audio output device according to the present embodiment, for example, an amplifier (amp), a speaker, and the like are exemplified. When the DSP and the audio output device are further provided, the information processing device 100 can give various kinds of notifications such as a start notification for starting communication through the first communication path or an error notification using a sound output from the audio output device.

In addition, the information processing device 100 can also have the configuration without, for example, the operation device 160 or the display device 162.

Referring to FIG. 12 again, an example of the configuration of the information processing device 100 will be described. The first communication unit 102 plays the role of performing communication with an external device such as the first control target device 200A or the second control target device 200B through the first communication path. Here, as the first communication unit 102, for example, a communication device that responds to a communication scheme that forms the first communication path such as an NFC interface or an infrared ray communication interface is exemplified.

The second communication unit 104 plays the role of performing communication with an external device such as the first control target device 200A or the second control target device 200B through the third communication path. Here, as the second communication unit 104, for example, a communication device that responds to a communication scheme that forms the third communication path such as an IEEE 802.15.1 port and a transmission-reception circuit, an IEEE 802.11b port and a transmission-reception circuit, and the like is exemplified.

The control unit 106 is constituted by, for example an MPU, various kinds of processing circuits, and the like, playing the role of controlling the entire information processing device 100. In addition, the control unit 106 has, for example, the decision unit 110 and the transmission control unit 112, playing the main role of performing the process relating to the information processing method according to the present embodiment.

The decision unit 110 plays the main role of performing the process (1) (decision process) described above to decide a transmission target control target device between the first control target device 200A or the second control target device 200B based on process capability information acquired from at least one of the first control target device or the second control target device through the first communication path.

To be more specific, the decision unit 110 decides a transmission target control target device based on, for example, process capability information that can be included in acquired capability information or process capability information acquired in communication that relates to the establishment of a session of the first communication path. When, for example, both of the process capability information of the first control target device and the process capability information of the second control target device are acquired, such as when both of the acquired capability information of the first control target device and capability information of the second control target device include the process capability information, the decision unit 110 determines a combination of presence or absence of the process capabilities of the first control target device 200A and the second control target device 200B with respect to data received through the first communication path based on, for example the process capability information of the first control target device 200A and the process capability information of the second control target device 200B. In addition, when the process capability information of a control target device is not acquired, such as when the acquired capability information of a control target device does not include the process capability information, the decision unit 110 determines the combination of presence or absence of the process capabilities of the first control target device 200A and the second control target device 200B with respect to data received through the first communication path by assuming that, for example, the corresponding control target device does not have the process capability with respect to data received through the first communication path. Then, based on the determined combination, the decision unit 110 decides a transmission target control target device by performing, for example, the process relating to the first example, the process relating to the second example, or the process relating to the third example shown in (1-1) to (1-3) described above.

In addition, the decision unit 110 decides a communication scheme for the second communication path based on, for example, connection information of the first control target device 200A, connection information of the second control target device 200B, or a user operation.

In addition, when the connection information includes information indicating a term of validity that enables use of the connection information in other devices, the decision unit 110 selectively sets the connection information to be in an invalid state based on, for example, such information indicating a term of validity. In addition, when the connection information includes information indicating a term of validity within which another device is allowed to use the connection information, the decision unit 110 may give, for example, a notification relating to the information indicating the term of validity to a user. Here, as the notification relating to the information indicating the term of validity, for example, a notification relating to the term of validity represented by the information indicating the term of validity, a notification indicating that the term of validity of the acquired connection information has expired, or the like is exemplified.

The transmission control unit 112 plays the main role of performing the process (2) (transmission control process) described above to transmit connection information of the other control target device to the transmission target control target device decided by the decision unit 110.

To be more specific, the transmission control unit 112 causes the connection information to be transmitted through, for example, the communication path that responds to the combination of presence or absence of the process capabilities with respect to data received through the first communication path which is determined by the decision unit 110. In addition, the transmission control unit 112 causes, for example, the connection information that responds to the communication scheme decided by the decision unit 110 to be transmitted.

Here, in the case in which the connection information is to be transmitted through the first communication path, when the connection information can be transmitted to a transmission target control target device through the first communication path that relates to acquisition of the process capability information of the transmission target control target device, the transmission control unit 112 causes, for example, connection information to be transmitted through the first communication path that relates to the acquisition of the process capability information. In addition, in the case in which the connection information is to be transmitted through the first communication path, when it is difficult to transmit the connection information to the transmission target control target device through the first communication path that relates to the acquisition of the process capability information of the transmission target control target device, the transmission control unit 112 causes communication with the transmission target control target device through the first communication path to be performed again. Then, the transmission control unit 112 causes the connection information to be transmitted to the transmission target control target device through the first communication path that is formed again.

Note that, when the connection information is transmitted through the first communication path, the first communication path through which the transmission control unit 112 causes the connection information to be transmitted is not limited to the above. For example, in the case in which the connection information is transmitted through the first communication path, even when the connection information can be transmitted to the transmission target control target device through the first communication path that relates to the acquisition of the process capability information of the transmission target control target device, the transmission control unit 112 may cause communication with the transmission target control target device through the first communication path to be performed again.

As the control unit 106 has, for example, the decision unit 110 and the transmission control unit 112, the control unit leads the process relating to the information processing method according to the present embodiment.

Note that a configuration of the control unit according to the present embodiment is not limited to the above. For example, the information processing device according to the present embodiment may further have a notification control unit (not illustrated) that causes the display unit, an external display device, or the like to give various kinds of notifications such as a start notification for starting communication through the first communication path, an error notification, or a notification that relates to information indicating a term of validity. When the notification control unit (not illustrated) is provided, for example, the notification control unit (not illustrated) gives various kinds of notifications according to the present embodiment in the information processing device according to the present embodiment.

In addition, for example, the information processing device according to the present embodiment can have one or two or more of the decision unit 110, the transmission control unit 112, and the notification control unit (not illustrated) that constitute the control unit separately (for example, each of the units can be realized as a separate processing circuit).

The information processing device 100 performs the process relating to the information processing method according to the present embodiment (for example, the process (1) (decision process) described above, and the process (2) (transmission control process) described above) with, for example, the configuration shown in FIG. 12. Accordingly, the information processing device 100 can control communication performed between the control target devices with, for example, the configuration shown in FIG. 12.

Note that a configuration of the information processing device according to the present embodiment is not limited to the configuration shown in FIG. 12. For example, in the case of a configuration in which communication through the first communication path or communication through the third communication path is performed using a connected external communication device, the information processing device according to the present embodiment may have the configuration without the first communication unit 102 and/or the second communication unit 104. Even with the configuration without the first communication unit 102 and/or the second communication unit 104, the information processing device according to the present embodiment can perform the communication through the first communication path and/or communication through the third communication path with an external device such as a control target device using the external communication device. Thus, even with the configuration without the first communication unit 102 and/or the second communication unit 104, the information processing device according to the present embodiment can control communication performed between the control target devices in the same manner as the information processing device 100 shown in FIG. 12.

In addition, the information processing device according to the present embodiment may further have, for example, an audio output unit (not illustrated) that can output sounds. Here, as the audio output unit (not illustrated), for example, a DSP and an audio output device are exemplified. When the audio output unit (not illustrated) is provided, the information processing device according to the present embodiment can give various kinds of notifications according to the present embodiment to a user using sounds output from the audio output unit (not illustrated).

As described above, the information processing device according to the present embodiment performs, for example, the process (1) (decision process) described above and the process (2) (transmission control process) described above as processes relating to the information processing method according to the present embodiment. Here, the information processing device according to the present embodiment decides a transmission target control target device (a control target device to which the connection information of the other control target device is to be transmitted) in the process (1) (decision process) described above, and causes the connection information of the other control target device to be transmitted to the decided transmission target control target device in the process (2) (transmission control process) described above. In addition, the transmission target control target device decided in the process (1) (decision process) described above is a control target device between the first control target device and the second control target device that can receive the connection information of the other control target device and process the connection information.

Thus, as the information processing device according to the present embodiment performs the process (1) (decision process) described above and the process (2) (transmission control process) described above, the transmission target control target device can perform communication with the other control target device through the second communication path using the connection information. In other words, as the information processing device according to the present embodiment performs the process (1) (decision process) described above and the process (2) (transmission control process) described above, the first control target device and the second control target device can perform communication with each other through the second communication path even when, for example, one or each of the first control target device and the second control target device is a device to which an NFC tag or the like is affixed.

Therefore, the information processing device according to the present embodiment can control the communication performed between the control target devices by performing the processes relating to the information processing method according to the present embodiment. In addition, as the information processing device according to the present embodiment controls the communication performed between the control target devices, various kinds of handover between the control target devices can be realized.

In addition, since the information processing method according to the present embodiment causes the connection information of the other control target device to be transmitted to the transmission target control target device, it is not necessary for the user to be aware of the authentication process or the setting process for the first control target device and the second control target device to perform the communication through the second communication path. Thus, the information processing method according to the present embodiment can enhance convenience for the user by performing the processes relating to the information processing method according to the present embodiment.

Hereinabove, the information processing device has been described to exemplify the present embodiment, however, the present embodiment is not limited thereto. The present embodiment can be applied to various devices, for example, a communication device such as a mobile telephone, or a smartphone, a computer such as a PC, a tablet-type device, a video and music reproduction device (or video and music recording and reproduction device), a game device, an imaging device such as a digital still camera or a digital video camera, and the like. In addition, the present embodiment can also be applied to, for example, a processing IC that can be incorporated into the devices described above.

In addition, the control target device has been described to exemplify the present embodiment, however, the present embodiment is not limited thereto. The present embodiment can be applied to various devices, for example, a computer such as a PC, a communication device such as a mobile telephone, or a smartphone, a tablet-type device, a printer, a video and music reproduction device (or video and music recording and reproduction device), a game device, an imaging device such as a digital still camera or a digital video camera, and the like.

(Program According to the Present Embodiment)

As a program for causing a computer to function as the information processing device according to the present embodiment (program that can execute the process relating to the information processing method according to the present embodiment, for example, the process (1) (decision process) described above, the process (2) (transmission control process) described above, and the like) is executed in the computer, communication between control target devices can be controlled.

The preferred embodiment of the present disclosure has been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, in the above description, provision of a program for causing a computer to function as the information processing device according to the present embodiment (computer program) is shown, however, the present embodiment can further provide a recording medium on which the program is stored.

The configuration described above is an example of the present embodiment, and of course falls within the technical scope of the present disclosure.

Additionally, the present technology may also be configured as below.

(1) An information processing device including:

a decision unit configured to decide, based on process capability information acquired through a first communication path from at least one of a first control target device and a second control target device which are target devices to be caused to perform wireless communication through a second communication path that is different from the first communication path, the process capability information indicating whether or not it is possible to process data received through the first communication path, a transmission target control target device between the first control target device and the second control target device, which is a control target device to which connection information of the other control target device is to be transmitted out of connection information acquired from each of the first control target device and the second control target device through the first communication path for starting communication through the second communication path; and a transmission control unit configured to cause the connection information of the other control target device to be transmitted to the transmission target control target device.

(2) The information processing device according to (1), wherein, when the process capability information of the first control target device and the process capability information of the second control target device are acquired, the decision unit determines a combination of presence or absence of process capabilities of the first control target device and the second control target device with respect to data received through the first communication path based on the process capability information of the first control target device and the process capability information of the second control target device, and decides the transmission target control target device based on the determined combination.

(3) The information processing device according to (2), wherein, when the process capability information of one of the control target devices indicates that it is possible to process data received through the first communication path and the process capability information of the other control target device does not indicate that it is possible to process data received through the first communication path, the decision unit decides the one control target device as the transmission target control target device.

(4) The information processing device according to (3), wherein, when it is not possible to cause the connection information of the other control target device to be transmitted to the one control target device through the first communication path through which the process capability information has been acquired, the transmission control unit causes communication with the one control target device through the first communication path to be performed again to cause the connection information of the other control target device to be transmitted to the one control target device.

(5) The information processing device according to any one of (2) to (4), wherein, when the process capability information of the one control target device indicates that it is possible to process data received through the first communication path and the process capability information of the other control target device also indicates that it is possible to process data received through the first communication path, the decision unit decides a control target device between the first control target device and the second control target device which corresponds to the process capability information that has been acquired later as the transmission target control target device.

(6) The information processing device according to any one of (2) to (4), wherein, when the process capability information of the one control target device indicates that it is possible to process data received through the first communication path and the process capability information of the other control target device also indicates that it is possible to process data received through the first communication path, the decision unit decides the transmission target control target device based on the connection information of the first control target device and the connection information of the second control target device.

(7) The information processing device according to any one of (2) to (6), wherein, when the process capability information of the first control target device does not indicate that it is possible to process data received through the first communication path and the process capability information of the second control target device does not indicate that it is possible to process data received through the first communication path either, the decision unit determines presence or absence of process capabilities of each of the first control target device and the second control target device with respect to data received through a communication path that is formed based on the connection information based on connection information of the first control target device and connection information of the second control target device, and then decides the transmission target control target device based on a determination result of the presence or absence of the process capabilities with respect to data, or based on the determination result and an order of acquiring the process capability information, set priorities, or a user operation.

(8) The information processing device according to (7), wherein the transmission control unit causes the connection information of the other control target device to be transmitted through a third communication path that is formed based on the connection information of the transmission target control target device.

(9) The information processing device according to (1), wherein, when the process capability information of the one control target device is acquired and the process capability information of the other control target device is not acquired, the decision unit assumes that the other control target device does not have a process capability with respect to data received through the first communication path, determines a combination of presence or absence of process capabilities of the first control target device and the second control target device with respect to data received through the first communication path based on the assumed process capability of the other control target device with respect to data received through the first communication path and the process capability information of the one control target device, and then decides the transmission target control target device based on the determined combination.

(10) The information processing device according to any one of (1) to (9), wherein the decision unit decides a communication scheme for the second communication path based on the connection information of the first control target device and the connection information of the second control target device, and wherein the transmission control unit causes the connection information that responds to the decided communication scheme to be transmitted.

(11) The information processing device according to any one of (1) to (9), wherein the decision unit notifies a user of a communication scheme in which the first control target device and the second control target device are capable of communicating with each other based on the connection information of the first control target device and the connection information of the second control target device, and decides a communication scheme for the second communication path based on a user operation, and wherein the transmission control unit causes the connection information that responds to the decided communication scheme to be transmitted.

(12) The information processing device according to any one of (1) to (11), wherein the connection information is included in capability information which is acquired from each of the first control target device and the second control target device through the first communication path and which indicates a capability with respect to communication, and wherein at least one of the acquired capability information of the first control target device and capability information of the second control target device includes the process capability information.

(13) The information processing device according to any one of (1) to (11), wherein the process capability information is acquired in communication that relates to establishment of a session of the first communication path, which is performed with at least one of the first control target device and the second control target device, and wherein the connection information is acquired from each of the first control target device and the second control target device through the first communication path of which a session has been established.

(14) The information processing device according to any one of (1) to (13), wherein the connection information includes information indicating a term of validity within which another device is allowed to use the connection information, and wherein the decision unit gives a notification with respect to the term of validity indicated by the information indicating the term of validity included in the connection information of the other control target device.

(15) The information processing device according to any one of (1) to (13), wherein the connection information includes information indicating a term of validity within which another device is allowed to use the connection information, and wherein, when the connection information of the other control target device is not transmitted within the term of validity indicated by the information indicating the term of validity included in the connection information of the other control target device, the decision unit sets the acquired connection information to be in an invalid state.

(16) The information processing device according to (15), wherein the decision unit gives a notification that the term of validity of the acquired connection information has expired.

(17) An information processing method including:

a step of deciding, based on process capability information acquired through a first communication path from at least one of a first control target device and a second control target device which are target devices to be caused to perform wireless communication through a second communication path that is different from the first communication path, the process capability information indicating whether or not it is possible to process data received through the first communication path, a transmission target control target device between the first control target device and the second control target device, which is a control target device to which connection information of the other control target device is to be transmitted out of connection information acquired from each of the first control target device and the second control target device through the first communication path for starting communication through the second communication path; and a step of causing the connection information of the other control target device to be transmitted to the transmission target control target device.

(18) A program causing a computer to execute:

a step of deciding, based on process capability information acquired through a first communication path from at least one of a first control target device and a second control target device which are target devices to be caused to perform wireless communication through a second communication path that is different from the first communication path, the process capability information indicating whether or not it is possible to process data received through the first communication path, a transmission target control target device between the first control target device and the second control target device, which is a control target device to which connection information of the other control target device is to be transmitted out of connection information acquired from each of the first control target device and the second control target device through the first communication path for starting communication through the second communication path; and a step of causing the connection information of the other control target device to be transmitted to the transmission target control target device.

REFERENCE SIGNS LIST

100 information processing device
102 first communication unit
104 second communication unit
106 control unit 110 decision unit
112 transmission control unit
200A first control target device
200B second control target device

The invention claimed is:

1. An information processing apparatus comprising:
a communication interface for acquiring first capability information of a first control target device and acquiring second capability information of a second control target device via a first communication method;
processing circuitry to control determining a control target apparatus, from among the first control target device and the second control target device, which transmits connection information to start a communication via a second communication method; and
an output device, comprising at least one of a display device or an audio output device, for notifying a user to initiate communication via the first communication method,
wherein, when the first capability information of the first control target device and the second capability information of the second control target device are acquired, determining a control target apparatus comprises determining a combination of presence or absence of process capabilities of the first control target device and the second control target device with respect to data received via the first communication method based on the first capability information and the second capability information, and
wherein when process capabilities are present in both the first control target device and the second control target device with respect to data received via the first communication method, the control target apparatus is determined according to which of the first capability information and the second capability information is later received.

2. The information processing apparatus according to claim 1, wherein the first control target device is a Near Field Communication (NFC) tag or a non-contact Integrated Circuit (IC) card.

3. The information processing apparatus according to claim 1, wherein the second control target device is a Near Field Communication (NFC) tag or a non-contact Integrated Circuit (IC) card.

4. The information processing apparatus according to claim 1, wherein the output device notifies the user to set a distance between the information processing apparatus and one of the first control target device or the second control target device.

5. The information processing apparatus according to claim 1, wherein the output device notifies the user to perform a touch operation on one of the first control target device or the second control target device.

6. The information processing apparatus according to claim 2, wherein, when the capability information of one of the control target devices indicates that it is possible to process data received through the first communication method and the capability information of the other control target device does not indicate that it is possible to process data received through the first communication method, the determining comprises determining the one control target device as the control target apparatus.

7. The information processing apparatus according to claim 1, wherein the second communication method is a Wi-Fi communication method.

8. An information processing method comprising:
acquiring, at an information processing apparatus, first capability information of a first control target device and acquiring second capability information of a second control target device via a first communication method;
determining a control target apparatus, from among the first control target device and the second control target device, which transmits connection information to start a communication via a second communication method; and
notifying a user to initiate communication via the first communication method,
wherein, when the first capability information of the first control target device and the second capability information of the second control target device are acquired, determining a control target apparatus comprises determining a combination of presence or absence of process capabilities of the first control target device and the second control target device with respect to data received via the first communication method based on the first capability information and the second capability information, and
wherein when process capabilities are present in both the first control target device and the second control target device with respect to data received via the first communication method, the control target apparatus is determined according to which of the first capability information and the second capability information is later received.

9. The information processing method according to claim 8, wherein the first control target device is a Near Field Communication (NFC) tag or a non-contact Integrated Circuit (IC) card.

10. The information processing method according to claim 8, wherein the second control target device is a Near Field Communication (NFC) tag or a non-contact Integrated Circuit (IC) card.

11. The information method according to claim 8, wherein the step of notifying comprises the step of notifying the user to set a distance between the information processing apparatus and one of the first control target device or the second control target device.

12. The information processing method according to claim 8, wherein the step of notifying comprises notifying the user to perform a touch operation on one of the first control target device or the second control target device.

13. The information processing method according to claim 8, wherein, when the capability information of one of the control target devices indicates that it is possible to process data received through the first communication method and the capability information of the other control target device does not indicate that it is possible to process data received through the first communication method, the determining comprises determining the one control target device as the control target apparatus.

14. The information processing method according to claim 8, wherein the second communication method is a Wi-Fi communication method.

15. A non-transitory computer-readable medium having stored thereon a program for implementing an information processing method comprising:
acquiring, at an information processing apparatus, first capability information of a first control target device and acquiring second capability information of a second control target device via a first communication method;

determining a control target apparatus, from among the first control target device and the second control target device, which transmits connection information to start a communication via a second communication method; and notifying a user to initiate communication via the first communication method, wherein, when the first capability information of the first control target device and the second capability information of the second control target device are acquired, determining a control target apparatus comprises determining a combination of presence or absence of process capabilities of the first control target device and the second control target device with respect to data received via the first communication method based on the first capability information and the second capability information, and wherein when process capabilities are present in both the first control target device and the second control target device with respect to data received via the first communication method, the control target apparatus is determined according to which of the first capability information and the second capability information is later received.

* * * * *